(12) United States Patent
Katoh et al.

(10) Patent No.: US 7,465,248 B2
(45) Date of Patent: Dec. 16, 2008

(54) PLANETARY GEAR TYPE REDUCTION GEAR WITH TORQUE LIMITER

(75) Inventors: Shinichi Katoh, Itabashi Ward (JP); Isao Enomoto, Itabashi Ward (JP); Kazuo Uzuka, Itabashi Ward (JP)

(73) Assignee: TOK Bearing Co., Ltd., Tokyo (JP)

( * ) Notice: Subject to any disclaimer, the term of this patent is extended or adjusted under 35 U.S.C. 154(b) by 252 days.

(21) Appl. No.: 11/398,587

(22) Filed: Apr. 6, 2006

(65) Prior Publication Data

US 2006/0287157 A1  Dec. 21, 2006

(30) Foreign Application Priority Data

Jun. 17, 2005 (JP) ............................. 2005-178564
Dec. 22, 2005 (JP) ............................. 2005-369148

(51) Int. Cl.
*F16H 3/74* (2006.01)

(52) U.S. Cl. ...................................................... 475/264

(58) Field of Classification Search ................. 475/264, 475/265
See application file for complete search history.

(56) References Cited

U.S. PATENT DOCUMENTS

| | | | | |
|---|---|---|---|---|
| 3,079,814 A | * | 3/1963 | Nickstadt ..................... 475/265 |
| 4,892,013 A | * | 1/1990 | Satoh ........................... 475/266 |
| 5,551,927 A | * | 9/1996 | Enzmann et al. ............. 475/265 |
| 5,732,805 A | * | 3/1998 | Nakamura ................. 192/223.1 |
| 6,010,426 A | * | 1/2000 | Nakamura .................... 477/22 |
| 6,702,090 B2 | * | 3/2004 | Nakamura et al. ....... 192/223.2 |
| 7,223,195 B2 | * | 5/2007 | Milbourne et al. .......... 475/298 |

* cited by examiner

*Primary Examiner*—Dirk Wright
(74) *Attorney, Agent, or Firm*—Wenderoth, Lind & Ponack, L.L.P.

(57) ABSTRACT

A planetary gear type reduction gear with torque limiter including an input shaft (7) of an output shaft of a DC motor and an output shaft (14) are journalized on a stationary member (11). At least one stage of the planetary gear type reduction mechanism includes a central gear (8), a planetary gear (34) meshed with the central gear (8), an inner gear (22) meshed with the planetary gear (34), and a carrier (30) journalizing the planetary gear (34). The inner gear (22) is disposed with a clearance to the stationary member 11 in a radial direction, and the inner gear (22) is opposed and disposed to the stationary member (11) in the axial direction by means of friction members (26, 28), which are urged against the inner gear (22). The inner gear 22 is retained at the side of the stationary member (11) in a slip rotation condition by the friction force between the friction members (26, 28) and the inner gear (22). The torque limiter is provided with a spring power adjusting device for adjustment of the pressing power of the pressing device that applies pressure to the friction members in a direction toward the inner gear.

15 Claims, 17 Drawing Sheets

PLANETARY GEAR TYPE REDUCTION GEAR WITH TORQUE LIMITER

BACKGROUND OF THE INVENTION

The present invention relates to a planetary gear type reduction gear with torque limiter, and more particularly to a planetary gear type reduction gear with torque limiter that moves a friction member in its axial direction relative to an inner gear to utilize its friction resistance.

A reduction gear mechanism of a type that outputs with a base of large reduction gear ratio by incorporating a planetary gear type reduction gear on a shaft of a DC motor has been known to the art.

Because of a construction of the DC motor that rotates a shaft by applying electric current to its coil, there is a characteristic that it is weak against a large load from the side of a shaft. Namely, in case a certain load is exerted to the shaft and a condition of the rotation of the motor shaft being stopped continues, the electric current applying to the coil becomes high, and as a result, the inside of the motor turns to the high temperature which results in seizure, melting an insulating material, causing a circuit short to cause a faulty contact which are some of the problems.

Furthermore, in case where a reduction gear mechanism with large reduction gear ratio is provided, rpm of an output shaft of the reduction gear mechanism becomes greatly smaller relative to rpm of the motor shaft so that the rotary torque becomes extremely great inversely at the output shaft of the reduction gear. In this condition, in case where large load is exerted on the output shaft of the reduction gear mechanism, which results in the great load on the gear portion in the reduction gear mechanism so that this undue large load causes a breakdown.

In order to solve the foregoing problems, in an assembly in which the planetary gear type reduction gear is incorporated in the shaft of the DC motor, a torque limiter is interposed in the assembly to form a structure of not transmitting the rotation in case a load of predetermined level is exerted on the output shaft of the reduction gear, the rotation is not transmitted, which had been conceived (for example, refer to official gazette of Japanese Patent laid open publication, KOKAI No. 2003-130146). This patent literature disclosed a construction wherein an O-ring that is a friction member is interposed between an outer periphery of an inner gear and an inner periphery of a case that is a stationary member is disclosed.

The planetary gear type reduction gear is constructed generally in that a central gear is provided on a rotary shaft of a motor corresponding to an input shaft, and a planetary gear is meshed with the central gear, and an inner gear is caused to mesh with the planetary gear and a carrier is provided to axially support the planetary gear. In case, a torque limiter wherein an O-ring that is a friction member is interposed in a radial direction between the outer periphery of the inner gear and the inner periphery of the case that is a stationary member is provided on this planetary gear type reduction gear, it is necessary that an axis of the inner periphery of the case that is the stationary member and an axis of the outer periphery of the inner gear must completely coincide with each other.

If the coincidence is not obtained, namely, the outer periphery of the inner gear is rotatively displaced relative to the inner periphery of the case, the contact pressure of the O-ring is resulted in the change, and also, the pressure contact in the bearing portion of the inner gear becomes large which renders the influence leading to the instability of the transmission torque at the rotative displacement of the inner gear. However, it is an extremely difficult thing to cause a complete coincidence of the axis of the inner periphery of the case that is the stationary member and the axis of the outer periphery of the inner gear, and as a result, such a structure will become an extremely expensive from the standpoints of the construction cost and of the precision level.

Moreover, with respect to those inventions of prior art disclosed in the patent literatures, both end portions of the stationary inner gear and the movable inner gear are brought to a contact condition with the inner end surface of the case so that it is subjected to getting the resisting power by the friction contact at this portion, and which forms a factor of causing the transmitting torque to the instability.

On the other hand, where a plurality of stages of the planetary gear type reduction gear mechanism are provided, and if a torque limiter is incorporated into the mechanism as a generally conceived structure, a reduction gear mechanism is connected to the DC motor, and a construction is conceived in that a torque limiter is caused to fit to the output shaft of the final stage reduction gear mechanism of the reduction gear mechanism.

However, this method has the following drawbacks. Namely, in case the rpm of the motor shaft is reduced, the bigger the reduction gear ratio, the rotary torque as a matter of fact becomes bigger. In other words, the later stage of the reduction gear mechanism, the more the reduction gear ratio becomes bigger, the rotary torque becomes large. In case the torque limiter is incorporated onto the output shaft of the final stage reduction gear mechanism of the reduction gear mechanism, the rotation is transmitted or cut at the portion where the rotary torque is the largest. In the construction where the transmission or cutting of the torque is designed to take by the friction force of the friction member, where the rotary torque is large, the large friction force is required for the torque transmission, and as a result, it cannot be avoided that the torque limiter mechanism becomes a large size.

Furthermore, in case of incorporating the torque limiter to the output shaft of the final stage reduction gear mechanism of the reduction gear mechanism, the reduction gear ratio at the final stage fluctuates depending on the design so that the rotary torque becomes different, and along with the fluctuation, torque limiter mechanism of different designs must be prepared. In other words, a common design to all the torque limiter mechanisms cannot be made.

A primary object of the present invention is to provide a planetary gear type reduction gear with torque limiter at a low cost that demonstrates always a torque limiter function in stable mode which keeps a constant contact pressure of a friction member such as an O-ring or the like in case the outer periphery of the inner gear is rotatably displaced relative to the inner periphery of the case even though the axis of the inner periphery of the case that is the stationary member and the axis of the outer periphery of the inner gear are not completely coincided, and also the contact pressure at the bearing portion of the inner gear does not influence on the transmission torque.

A secondary object of the present invention is to provide a planetary gear type reduction gear with torque limiter that does not lower the transmitting torque even though the friction member such as O-ring and the like wears off due to the use of a long period of time.

A tertiary object of the present invention is to provide a torque limiter mechanism in a small size in case of providing a plurality of stages of the planetary gear type reduction gear mechanism.

A fourth object of the present invention is to provide a common design of the torque limiter mechanism.

The fifth object of the present invention is to manufacture a limiter torque of accurate type matched with requirement without preparing many kinds of friction member such as O-rings of different cross sectional diameters or without preparing many kinds of pressing means of different pressing powers.

Furthermore, an object of the present invention is to facilitate simple torque adjustment of the limiter torque which matches using conditions of the customers.

SUMMARY OF THE INVENTION

The present invention is provided with a stationary member supporting an input shaft, an output shaft journaled on the stationary member, a central gear, a planetary gear, a planetary gear meshed with the central gear, an inner gear meshed with the planetary gear, and a carrier axially supporting the planetary gear, and at least one stage of the planetary gear type reduction gear mechanism and a torque limiter are installed between the input shaft and the output shaft. The torque limiter is constructed in that the inner gear is disposed at a clearance relative to the stationary member in a radius direction, and the inner gear is disposed in opposition to the stationary member by means of a friction member in its axial direction, and the friction member is applied with pressure against the inner gear in its axial direction, and the inner gear is retained at the side of the stationary member by the friction force.

Moreover, the present invention is characterized in that the friction members are provided at both sides of the inner gear, and the inner gear is disposed in opposition to the side of the stationary member by means of the friction member, and both sides of the inner gear are caused to contact the side of the stationary member by means of the friction member, and the inner gear is retained to the side of the stationary member by the friction force between the friction member and the stationary member and by the friction force between the friction member and the inner gear being held the member.

The present invention is constructed in that a plurality of stages of the planetary gear type reduction mechanism are provided and a planetary gear is meshed with the central gear, and an inner gear is meshed with the planetary gear, and a carrier for axially supporting the planetary gear is provided. The reduction gear mechanisms after the second stage is constructed in that the central gear is provided on the carrier of the reduction gear mechanism of the immediately preceding stage, and a planetary gear of the next stage is meshed with the central gear, and the inner gear is meshed with the planetary gear of the next stage, and a carrier for axially supporting the planetary gear of the next stage is provided.

The input shaft and output shaft are disposed coaxially in opposition, and a tubular bearing is inserted into both the shafts by crossing both the shafts, and both the shafts are connected relatively rotatable by the bearing. The carrier that axially supports the planetary gear meshed with the inner gear constituting the torque limiter is supported rotatably at the input shaft or the output shaft or at both the shafts by means of the bearing structure.

The present invention is characterized in that the friction member is a ring-like elastic member.

The present invention is provided by installing a pressing means for urging the friction member towards the inner gear at the stationary member.

The present invention is characterized in that the pressing member is a coil spring. The present invention is constructed in that a plurality of stages of the planetary gear type reduction mechanism are provided, and the first stage of the reduction gear mechanism is formed by providing a central gear on the input shaft, and meshing the inner gear with the planetary gear, and providing a carrier for axially supporting the planetary gear. The reduction gear mechanism after the second stage is formed by providing a central gear on the carrier of the reduction gear mechanism of a preceding stage, and meshing the planetary gear of the next stage with the central gear, and meshing the inner gear with the planetary gear of the next stage, and providing a carrier for axially supporting the planetary gear of the next stage. The torque limiter is constructed in that among the reduction gear mechanism of a plurality of stages, the inner gear that is the constituting element of the reduction gear preceding the reduction gear mechanism of the final stage is disposed at a clearance in the radius direction relative to the stationary member, and the friction member is disposed in opposition to the side in the axial direction of the inner gear, and the friction member is urged against the inner gear in the axial direction, and the inner gear is retained at the side of the stationary member with the friction power.

The torque limiter of the present invention is the reduction mechanism preceding the reduction gear mechanism of the final stage among the reduction gear mechanisms of a plurality of stages and the inner gear that is the constituting element of the reduction gear mechanism including the reduction mechanism that is the closest to the input shaft is disposed at a clearance in the radius direction relative to the stationary member, and the friction member is disposed in opposition to the side of the inner gear in the axial direction, and the friction member is pressed in the axial direction relative to the inner gear, and the inner gear is retained at the side of the stationary member by the friction power.

Furthermore, the present invention is to provide a spring power adjusting means for adjustment of pressing power of the pressing means at the side of the stationary member.

Furthermore, the present invention is characterized in that the pressing means is formed by a leaf spring.

Furthermore, the present invention is characterized in that the spring power adjusting means is a spring power adjusting member provided with a cam surface having a slope along a circumferential direction on the opposed surface of the pressing means, and the spring power adjusting member is journalized at the side of the stationary member so that it is rotatable by a remote control, and the pressing means is under pressure by the cam surface, and the pressing power of the pressing means is changed by the rotation of the spring power adjusting member.

The present invention is to provide a planetary gear type reduction gear with the torque limiter by the construction as described in the foregoing, and the construction can be built at low cost, and the contact pressure of the friction member such as the O-ring and the like seldom changes in case the outer periphery of the inner gear is rotatably displaced relative to the inner periphery of the case even though an axis of the inner periphery of the case that is the stationary member and an axis of the outer periphery of the inner gear are not in complete coincidence, and also, the contact pressure in the bearing portion of the inner gear does not exert an influence over the transmission torque, and demonstrates constantly a stable function of the torque limiter.

Further, the inner gear only makes a contact with the side of the stationary member by means of the friction member, and has no other contact portions and the friction member resistance influencing the torque limiter function is limited to the friction resistance by means of the friction member, and accordingly, the transmitting torque of the torque transmitter can be stabilized.

Furthermore, as it is possible to support the carrier stably which supports the planetary gear meshing with the inner gear for the torque limiter so that a rotary locus of the inner gear that is driven by the planetary gear and rotates with slipping can be almost made a constant, and an irregularity of the transmitting torque of the inner gear can be eliminated.

The transmitting torque is not deteriorated even if the friction member such as the O-ring and the like is worn off by the use of a long period of time.

In case of providing a plurality of stages of the planetary gear type reduction gear mechanism, as it is possible to exhibit the torque limiter function at a position where the rotary torque is small as compared with a construction where the torque limiter is installed on the output shaft of the reduction gear mechanism of the final stage of the reduction gear mechanism whereby the torque limiter mechanism can be constructed in small sizes. Furthermore, in case of providing a plurality of stages of the planetary gear type reduction gear mechanism, a reduction ratio in the final stage widely varies depending on designs and as a result, rotary torques are variable too but, since the torque limiter mechanism is constructed by utilizing the inner gear which is the constituting element of the reduction gear mechanism including the reduction gear mechanism being disposed most closely to the shaft of the DC motor, so that even if the reduction gear mechanism having more number of stages of the planetary gear type reduction gear mechanism is employed, or of the case of less number of stages, or only one stage alone, the rotary torque of the portion that transmits or cut off the rotation becomes a constant, and therefore one kind is suffice for the torque limiter mechanism, and thus a common design of the torque limiter mechanism can be provided.

Furthermore, the present invention is to manufacture a torque limiter that matches accurately the requirement without preparing many kinds of the friction members such as O-rings of different cross sectional diameters or without preparing many kinds of pressing means of different pressing powers.

Furthermore, the present invention is to facilitate simple torque adjustment of the limiter torque by matching conditions of use on the part of customers.

DETAILED DESCRIPTION OF THE INVENTION

An embodiment of the present invention will be described in detail in the following by referring to the attached drawings.

Figure 1:
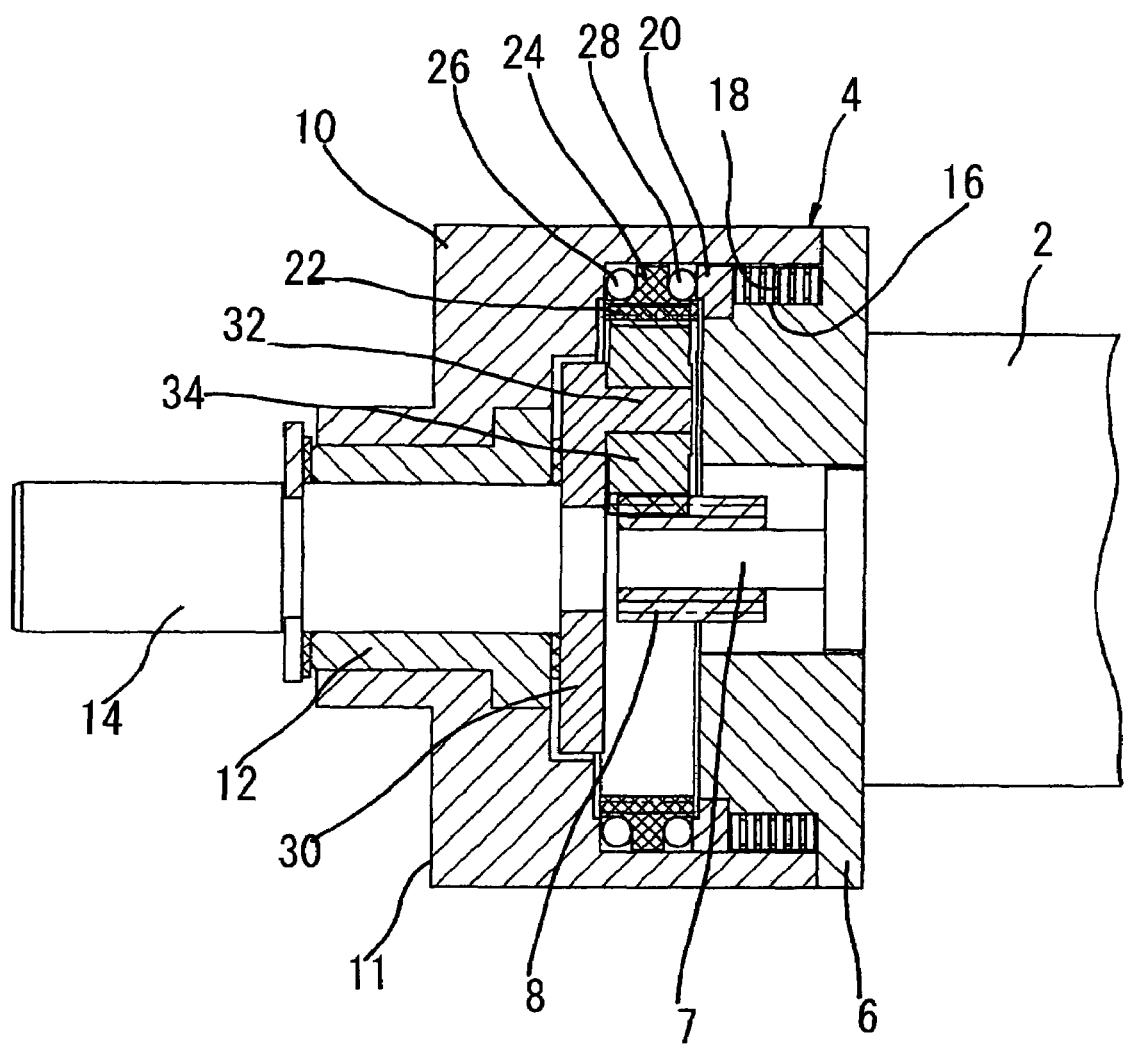
FIG. 1 is a cross section of the planetary gear type reduction gear with torque limiter according to the present invention.

FIG. 1 shows an embodiment mode wherein a torque limiter is provided on the one stage reduction gear, and wherein numeral 2 denotes a reduction gear device, and is formed by a DC motor. A case of the reduction gear device 2 is fixed with a cover 6 of the planetary gear type reduction gear 4 with torque limiter. An output shaft of the reduction gear device 2 is formed by an input shaft 7 of the reduction gear 4 and this input shaft 7 is fixed with a central gear 8.

Numeral 10 denotes a cylindrical case of the reduction gear 4. A bearing 12 is fixed to an inner radial portion of the case, and an output shaft 14 is rotatably journaled on the bearing 12 at a position on an extension line that is coaxial with the input shaft 8. A disc type cover 6 having an axial hole is fixed to the case 10, and the cover 6 and the case 10 constitute an almost cylindrical shaped stationary member 11. Holding holes 16 extending in axial direction of plurality of the stationary members 11 are bored on an outer periphery of the cover 6 at almost equal intervals in a circumferential direction, and a coil spring 18 forming a pressing means is inserted and disposed in each holding hole 16.

For reference, as the pressing means, the leaf spring and other spring means besides the coil spring may be utilized.

Numeral 20 denotes a ring-like pressing member, and its inner periphery slidably fits on the outer periphery of the cover 6 at one side along its axial direction, and its outer periphery is in contact slidably with an inner periphery of the case 10. One surface of the coil spring 18 is elastically in contact with one surface of the pressing member 20, and is energized in the left direction in the drawing, namely, the axial direction of the stationary member 11 by the coil spring 18.

The pressing member 20 is bored with a pin hole in the axial direction of the pressing member 20, and a pin, which is disposed at the side of the cover 6, is slidably inserted into the pin hole, and thus, the rotation of the pressing member 20 against the stationary member 11 is engaged by this construction.

Numeral 22 denotes a ring-like inner gear, and the inner gear 22 is disposed at an interval in the radius direction relative to the stationary member 11. Namely, an outer periphery of a convex stripe portion 24 formed on the outer periphery of the proper of the inner gear 22 is inserted and disposed at a slight interval on the inner periphery of a thin wall portion of the case 10. Numerals 26, 28 denote friction members made of O-ring provided with elasticity and a friction surface, and are disposed in opposition at both side surfaces of the convex stripe portion 24 which is the side of the inner gear 22 in its axial direction, and the friction members 26, 28 are urged against the inner gear 22 in the axial direction and the inner gear 22 is retained at the side of the stationary member 11 by the friction force between the friction members 26, 28 and the side of the stationary member 11 and the friction force between the friction members 26, 28 and the inner gear 22.

The friction members 26, 28 are compressed and disposed between an engaging surface perpendicular to the axial direction formed on the inner radial portion of the case 10 and the side of the convex stripe portion 24 and also between the other side of the convex stripe portion 24 and the pressing member 20. The inner gear 22 is sandwiched in the axial direction of the inner gear 22 by the pressing force of the coil spring 18 and both the side surfaces of the convex stripe portion 24 by the friction members 26, 28, and is retained at the side of the stationary member by means of the friction members 26, 28 by the sandwiching pressure in the axial direction. By the way, herein the axis of the inner gear 22 means a center axis and the axial direction of the inner gear 22 means the right and left direction in FIG. 1 which is a direction almost parallel direction against the center axis.

Numeral 30 denotes a carrier pressed and fixed to the one end side of the output shaft 14 and a planetary gear 34 is rotatably fitted on the carrier pin 32, which projects in the axial direction from an eccentric portion of the disc-shaped portion of the carrier. One side of the planetary gear 34 is meshed with the inner teeth of the inner gear 22, and the other side is meshed with the central gear 8.

When the inner gear 22 is applied with load torque exceeding a predetermined magnitude from the output shaft 14 side such that the output shaft 14 is stopped, a slip rotation is caused against the case 10 by resisting the friction holding power of the friction members 26, 28. In the condition where the load torque does not reach a predetermined value, the inner gear 22 is constructed to hold a non-rotating condition of being fixed to the case 10. The friction holding power that holds the inner gear 22 in a slip rotation possible condition to the side of the stationary member 11 can be adjusted by selecting a coil spring 18 having a different elastic modulus.

Also, the friction holding power for holding the inner gear 22 in the slip rotation possible condition to the side of the stationary member 11 may be changed with the change of the O-rings 26, 28 that are friction members to O-rings formed of materials having different elastic modulus, and other various methods can be employed.

In the foregoing construction, when the input shaft 7 rotates, the central gear 8 rotates at the same speed, and this rotation of the gear 8 is transmitted to the planetary gear 34. The planetary gear 34 revolves and the carrier 30 rotates with the axis of the carrier pin 38 as the axis, and revolves along the inner gear 22. When the planetary gear 40 revolves, the secondary gear 36 rotates, and the output is produced from the output shaft 14 at a predetermined reduction ratio.

On the other hand, when a load above a predetermined value, namely, a load above a slip torque is applied to the output shaft 14, the carrier 30 stops, and the rotary torque of the planetary gear 34 works on the inner gear 22 with the carrier pin 32 as a fulcrum. The inner gear 22 meshed with the planetary gear 34 by the rotary torque from the planetary gear 34 on the inner gear 22 makes a slip rotation along the inner periphery of the case 10 by resisting the sandwiching pressure friction holding power by the friction members 26, 28. There is no chance that the overload is applied to the reduction gear device, namely, the DC motor by the slip rotation.

In the foregoing embodiment, although the friction members 26, 28 are opposed and disposed at both sides of the inner gear 22, one friction member 28 or 24 may suffice, and the one side surface of the convex stripe portion 24 of the inner gear 22 may be arranged to contact the smooth surface of the inner radial portion of the case 10 facing the one side surface or the pressing member 20 in the axial direction. In this case, it is a better idea of constructing a means for reducing the friction power such as the interposition of the bearing and the like between the surface of the case 10 making the direct contact and the one side surface of the projected portion 24 of the inner gear 22.

In the foregoing embodiment, the inner gear 22 is disposed at a clearance in the radial direction relative to the stationary member 11, and the inner gear 22 is opposed and disposed relative to the stationary member 11 in the axial direction by means of the friction members 26, 28, and the friction members 26, 28 are urged against the inner gear 22 in the axial direction, and the inner gear 22 is retained at the side of the stationary member 11 by friction power whereby a torque limiter is constructed.

Another embodiment of the present invention will be described in the following with reference to FIG. 2.

Figure 2:
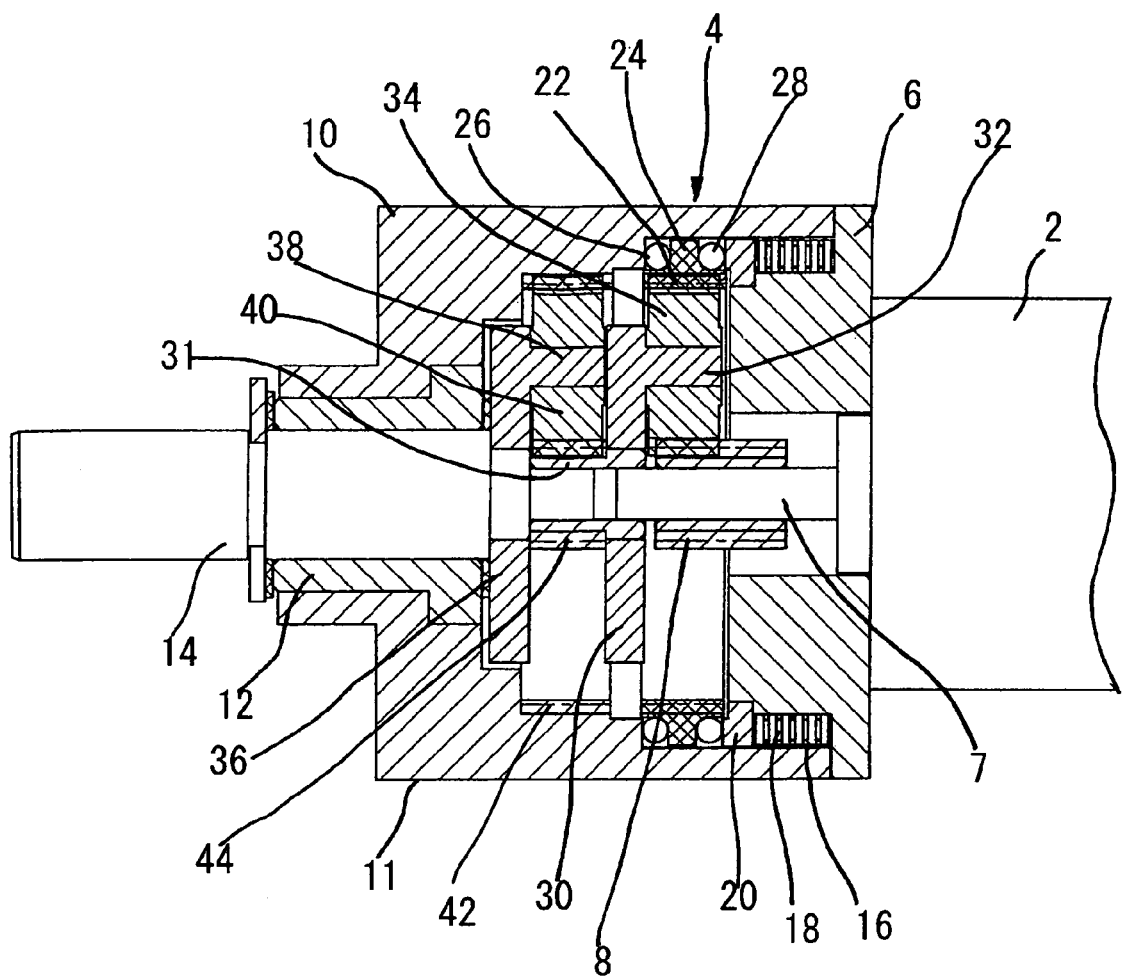
FIG. 2 is a cross section illustrating another embodiment of the planetary gear type reduction gear with torque limiter according to the present invention.

FIG. 2 shows an embodiment wherein the torque limiter is provided at the stage of the two stage reduction gear, and in the drawing, numeral 2 denotes a reduction gear device, and a cover 6 of the planetary gear type reduction gear 4 with torque limiter is fixed to the case of the device 2. A central gear 8 is fixed to an input shaft 7 that is the output shaft of the reduction gear device 2.

Numeral 10 denotes a case of the reduction gear 4, and a bearing 12 is fixed to its inner radial portion, and an output shaft 14 is rotatably journaled on the bearing 12. The cover 6 is fixed to the case 10, and the cover 6 and the case 10 constitute the stationary member 11. A plurality of holding holes 16 extending in the axial direction of the stationary member 11 are bored in the outer peripheral portion of the cover 6 at almost equal intervals, and a coil spring 18 is inserted and disposed in each holding hole 15.

Numeral 20 denotes a ring-like pressing member, and its inner periphery slidably fits an outer periphery of one side of the cover 6 along the axial direction, and the outer periphery slidably contacts the inner periphery of the case 10. One surface of the pressing member 20 elastically contacts the coil spring 18, and is energized in the left direction in the drawing, namely, in the axial direction of the stationary member 11 by the coil spring 18.

The pin holes are formed in the pressing member 20 in its axial direction, and the pin disposed at the side of the cover 6 is slidably inserted into the pin hole, and thereby the rotation of the pressing member 20 relative to the stationary member 11 is stopped. Numeral 22 denotes a ring-like inner gear, and the inner gear 22 is disposed at a clearance formed by the stationary member 11 in the radial direction. Namely, the outer periphery of the convex stripe portion 24, formed on the outer periphery of the proper of the inner gear 22, is inserted and disposed with a slight clearance on the inner periphery of a thin wall portion of the case 10. Numerals 26, 28 denote friction members consisting of O-rings provided with elasticity and friction surfaces, and are opposed and disposed to the side of the inner gear 22 in the axial direction, and the friction members 26, 28 apply pressure to the inner gear 22 in the axial direction by the energizing force from the coil spring 18 and the inner gear 22 is retained in the stationary member 11 by the friction power between the friction members 26, 28 and the stationary member 11 and the friction power between the friction members 26, 28 and the inner gear 22.

The friction members 26, 28 are compressed and disposed between the engaging surface perpendicular to the inner radial portion of the case 10 in the axial direction and one side surface of the convex stripe portion 24 and between the other side surface of the convex stripe portion 24 and the pressing member 20. The inner gear 22 is sandwiched under pressure by the pressing power of the coil spring 18, and both side surfaces of the convex stripe portion 24 are sandwiched in the axial direction of the inner gear 22 by the friction members 26, 28, and the inner gear 22 is retained at the side of the stationary member 11 by means of the friction members 26, 28.

Numeral 30 denotes a first carrier that is rotatably journaled on the input shaft 7 and the output shaft 14, and the planetary gear 34 is rotatably journaled on the carrier pin 32. The one side of the planetary gear 34 is meshed with the inner teeth of the inner gear 22, and the other side is meshed with the central gear 8. The inner gear 22 makes a slip rotation relative to the case 10 by resisting the friction holding power provided by the friction members 26, 28 when a predetermined load torque is applied from the side of the output shaft 14 such as the stop of the output shaft 14, and the inner gear 2 similarly constructed in that it holds a non-rotating condition against the case 10 in the condition where the load torque does not reach a predetermined value.

The friction holding power that keeps the inner gear 22 in non-rotating condition at the side of the stationary member 11 can be adjusted by the selection of materials forming the coil spring 18 which have different moduluses of elasticity, and also, a variety of methods can be employed.

A tubular sliding bearing 31 is fixed to the hole bored on the disc type portion of the carrier 30, and the sliding bearing 31 rotatably fits the small diameter portion of the output shaft 14, which is opposed and disposed on the same axis of the input shaft. The center axis of the input shaft 7 and the output shaft 14 coincide with the axis of the inner periphery of the case 10, and the carrier 30 is rotatable with the axis as a fulcrum. A central gear 44 is formed integrally on the outer periphery of the sliding bearing 31. A second carrier 36 is fixed to the output shaft 14 and the planetary gear 40 is rotatably journaled on the carrier pin 38.

One side of the planetary gear 40 is meshed with the inner teeth of the inner gear 42 formed integrally with the inner radial portion of the case 10, and the other side is meshed with the central gear 44.

At this point, the inner gear 22 may be separately prepared against the case 10, and this gear 22 may be fixed to the case 10 thereby allowing no rotation.

In the foregoing construction, when the input shaft 7 rotates, the central gear 8 rotates at the same speed, and this rotation is transmitted to the planetary gear 34. The planetary gear 34 rotates with the carrier pin 32 as the rotary axis, and as it is fixed to the side of the stationary member 11 by means of the friction members 26, 28, it revolves along the inner gear 22 with the axis of the inner periphery of the case 10 as a fulcrum. When the planetary gear 34 revolves, the carrier 30 rotates with the axis of the inner periphery of the case 10 as shaft center, and the central gear 44 rotates.

The planetary gear 40 rotates with the carrier pin 38 as the rotary axis with the rotation of the central gear 44, and revolves along the inner gear 42. When the planetary gear 40 revolves, the second carrier 36 rotates, and the output is produced from the output shaft 14 at a predetermined reduction ratio.

On the other hand, when predetermined load, namely, the load above a slip torque is applied to the output shaft 14 due to some reason, the revolving motion of the planetary gear 40 stops due to the load, and the carrier 30 meshed with the planetary gear 40 by means of the central gear 44 stops, and the rotation torque of the planetary gear 34 works on the inner gear 22 with the carrier pin 32 as the fulcrum, and the inner gear 22 meshed with the planetary gear 34 makes a slip rotation along the inner periphery of the case 10 by resisting the sandwiching friction holding power of the friction members 26, 28 which is caused by the rotation torque from the planetary gear 34.

There is no chance that the overload will be applied to the DC motor by the slip rotation. The planetary gear 34 is firmly supported by the sliding bearing 31 at a position with a fixed distance in the radial direction against the shaft center of the case 10, namely, the input shaft 7 and the output shaft 14. For this reason, when the inner gear 22 makes the slip rotation meshed with the planetary gear 34 by its rotation, the locus of the rotation becomes a true circle centering with the axis of the case 10, and the slip surface of the inner gear 22 with the side of the friction members 26, 28 or the case 10 forms an almost constant locus. With this arrangement, the contacting pressure between the inner gear 22 with the side of the friction members 25, 28 or the case 10 never changes, and accordingly, the transmission torque of the inner gear 22 is always constant, and there is no dispersion.

In this embodiment, similar to the foregoing embodiments, there is no limitation to the construction of the inner gear 22 with the arrangement of the friction members 26, 28 at both sides of the axial direction of the inner gear 22, and only one of the friction members 28, 26 may suffice, and the construction of arranging the one side surface of the convex stripe portion 24 of the inner gear 22 in direct contact with the smooth surface perpendicular in the axial direction of the inner radial portion of the case 10 or the pressing member 20 which faces in opposition to the one side surface can be selected.

Another embodiment of the present invention is described in the following by referring to FIG. 3.

Figure 3:
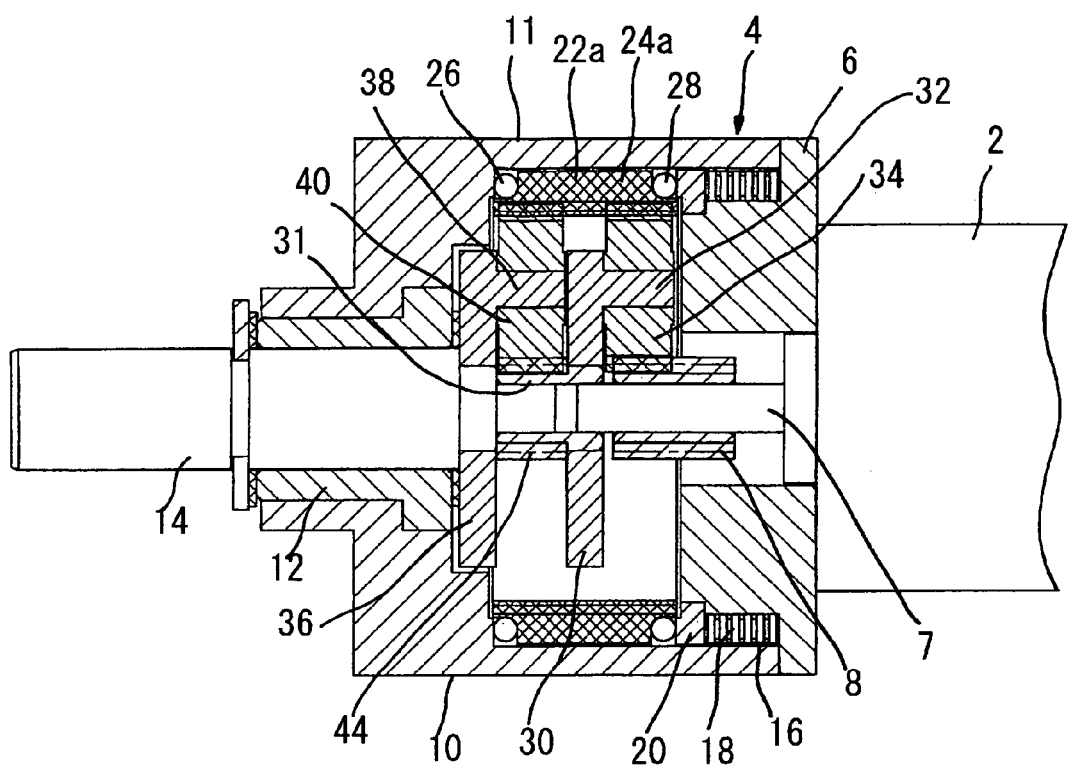
FIG. 3 is a cross section showing another embodiment of the planetary gear type reduction gear with torque limiter according to the present invention.

FIG. 3 shows an embodiment wherein a torque limiter is provided at a first stage and a second stage of the two stage reduction gear and in the drawing, numeral 2 denotes a reduction device, and a cover 6 of the planetary gear type reduction gear 4 with torque limiter is fixed to its case. A central gear 8 is fixed to an input shaft 7 consisting of an output shaft of the reduction gear device 2. Numeral 10 denotes a case of the reduction gear device 4, and a bearing 12 is fixed to its radial portion, and an output shaft 14 is rotatably journaled to the bearing 12. The cover 6 is fixed to the case 10, and the cover 6 and the case 10 form the stationary member 11. In an outer periphery of the cover 6, a plurality of holding holes 16, extending in axial direction of the stationary member 11, are bored at almost equal intervals in its circumferential direction, and a coil spring 18 is inserted into each holding hole 16. Numeral 20 denotes a ring-like pressing member, and its inner peripheral surface is slidably fit along its axial direction on the outer peripheral surface of one side of the cover 6, and its outer peripheral surface is in contact slidably with an inner peripheral surface of the case 10. One surface of the pressing member 20 is elastically in contact with the coil spring 18, and is energized in the axial direction of the stationary member 11, which is the left direction in FIG. 3, by the coil spring 18. The pressing member 20 is formed with pin holes in the axial direction thereof, and a pin, disposed at the side of the cover 6, is slidably inserted into the pin hole, and with this construction, rotation of the pressing member 20 relative to the stationary member 11 is prevented. Numeral 22*a* denotes an inner gear having a ring-like shape, and the inner gear 22*a* is disposed at an interval in the radial direction relative to the stationary member 11. Namely, the outer periphery of the convex stripe portion 24*a* formed on the outer periphery of the proper of the inner gear 22*a* is inserted and disposed with a slight gap between the inner periphery of the thin wall portion of the case 10.

Numerals 26, 28 denote friction members made of O-rings provided with an elasticity and friction surface, and the O-rings are disposed in opposition at the side of the inner gear 22*a* in its axial direction, and the friction members 26, 28 apply pressure to the inner gear 22*a* in its axial direction and the inner gear 22*a* is retained at the side of the stationary member 11 by the friction force between the side of the stationary member 11 and the friction members 26, 28 and the friction force between the friction members 26, 28 and the inner gear 22*a* pressed by the members.

The friction members 26, 28 are compressed and disposed between an engaging surface, which is perpendicular to the axial direction, formed on the inner radial portion of the case 10 and one side of the convex stripe portion 24 and between the other side of the convex stripe portion 24 and the pressing member 20. The inner gear 22*a* is sandwiched in the axial direction of the inner gear 22*a* by the pressing force of the coil spring 18 and both side surfaces of the convex stripe portion 24*a* are sandwiched by the friction members 26, 28, and the convex stripe portion 24 is retained at the side of the stationary member 11 by means of the friction members 26, 28 with the sandwiching power in the axial direction. Numeral 30 denotes a first carrier journaled rotatably on the input shaft 7 and the output shaft 14, and the planetary gear 34 is rotatably supported on the carrier pin 32. One side of the planetary gear 34 is meshed with the inner teeth of the inner gear 22*a*, and the other side is meshed with the central gear 8. The inner gear 22*a* makes a slip rotation against the case 10 by resisting the friction holding force of the friction members 26, 28 when the output shaft 14 is stopped and the load torque exceeding the predetermined value is applied to the inner gear from the output shaft 14 side, and in the condition where the load torque does not reach a predetermined value, the inner gear 22*a* retains a non-rotating condition by being fixed to the case 10. The friction holding power that holds the inner gear 22*a* from slipping relative to the stationary member 11 side can be adjusted by selecting a coil spring 18 with a different elastic modulus. Also, the friction holding force that keeps the inner gear 22 from slipping relative to the side of the stationary member 11 can be changed by selecting the O-rings 26, 28 that are formed of friction materials having different elastic modulus, and other methods can be conceived.

The sliding bearing 31 of tubular shape is fixed to the hole bored in the disc portion of the carrier 30, and the sliding bearing 31 fits rotatably to a small diameter portion of the output shaft 14 opposed and disposed on the input shaft. The center axis of the input shaft 7 and the output shaft 14 coincides with the axis of the inner periphery of the case 10, and the carrier 30 is rotatable with the axis as the pivot. The central gear 44 is formed integrally on the outer periphery of the sliding bearing 31. The second carrier 36 is fixed to the output shaft 14, and the planetary gear 40 is rotatably journaled on the carrier pin 38. One side of the planetary gear 40 is meshed with the inner teeth of the inner gear 22*a*, and the other side is meshed with the central gear 44.

In the foregoing construction, when the input shaft 7 rotates, the central gear 8 rotates at the same speed, and this rotation is transmitted to the planetary gear 34. The planetary gear 34 rotates with the carrier pin 32 as its rotary axis, and revolves with the axis of the inner periphery of the case 10 as the axis along the inner gear 22*a*. When the planetary gear 34 revolves, the carrier 30 rotates with the axis of the inner periphery of the case 10 as the pivot, and the central gear 44 rotates. The planetary gear 40 rotates with the carrier pin 38 as the rotary axis by the rotation of the central gear 44, and revolves along the inner gear 22*a*.

The second carrier 36 rotates as the planetary gear 40 revolves and the output reduced at a predetermined reduction ratio is produced from the output shaft 14.

During the rotation of the input shaft 7 by the drive of the DC motor, the inner gear 22*a* receives the rotary torque of the planetary gear 34 with the carrier pin 32 as the pivot and the rotary torque of the planetary gear 40 with the carrier pin 38 as the pivot in the same rotating direction with the gear 34 according to the load worked on by the output shaft 14. While the load applied to the output shaft 14 is within a predetermined range, the inner gear 22*a* does not slip due to the rotary torque from the planetary gears 34, 40 and maintains the condition where the gear 22*a* is fixed to the stationary member 11 by the holding power of the friction members 26, 28 without slipping due to the rotary torque from the planetary gears 34, 40.

On the other hand, when the load above a predetermined value, namely, the load above the slip torque is applied to the output shaft 14 such as when the output shaft 14 is stopped due to certain reasons, the rotary torque against the inner gear 22*a* of the planetary gears 34, 40 increases due to this load, and the gear 22*a* starts the slip rotation by resisting the friction force of the friction members 26, 28. With the slip rotation, the rotation of the output shaft 14 stops, and the revolving motion of the planetary gear 40 is blocked. While, the rotation of the central gear 8 is transmitted to the planetary gear 34, and the planetary gear 34 rotates. When the planetary gear 34 rotates, the planetary gear 34 revolves along the inner gear 22*a*, and the first carrier 30 rotates by the revolving motion, and this rotation is transmitted to the planetary gear 40, and the planetary gear 40 rotates with the carrier pin 38 of the second carrier 36 as the fulcrum. The inner gear 22*a* slips along the inner periphery of the case 10 by resisting the friction power of the friction members 26, 28 and the slip rotation continues until the load acting on the output shaft 14 falls below the slip torque.

During the slip rotation of the inner gear 22*a*, the planetary gear 34 revolves along the inner gear 22*a* in a counter direction relative to the slip rotation of the inner gear 22*a* while making the rotation as the carrier pin 32 as fulcrum. The overloading of the DC motor can be prevented by the slip rotation of the inner gear 22*a*.

By the way, during the slip rotation of the inner gear 22*a*, the relative rotating motion of the planetary gear 34 that rotates at high speed by interlocking with the central gear 8 against the inner gear 22*a* is reduced of its speed by the revolving motion in counter direction relative to the slip rotating motion of inner gear 22*a* against the stationary member 11. As a result, the relative rotating motion of the planetary gear 40 of the rear stage against the inner gear 22*a* which is reduced of its speed and the relative rotating motion of the planetary gear 34 against the inner gear 22a become an identical speed, and the inner gear 22a makes the slip rotation against the stationary member 11 by the rotation of two pieces of the planetary gears 40, 34.

The planetary gear 34 is firmly supported at a position with a fixed interval in the radial direction from the center axis of the input shaft 7 and the output shaft 14 which is the axis of the case 10 by the sliding bearing 31.

For this reason, when the inner gear 22a meshed with the planetary gear 40 and the planetary gear 34 makes the slip rotation by the rotation of the planetary gears 40 and 34, the locus of the rotation becomes a true circle formed by centering with the axis of the case 10 as the pivot, and the slip surface of the inner gear 22a with the side of the friction members 26, 28 or the side of the case 10 forms an almost fixed locus. The contact pressure of the inner gear 22a with the friction members 26, 28 or the side of the case 10 does not change, and accordingly, the transmitting torque of the inner gear 22a becomes constant, and the dispersion never occurs.

In this embodiment similar to the foregoing embodiment, it is not limited to the construction of disposing the friction members 26, 28 at both sides of the inner gear 22a in its axial direction in an opposed arrangement, and the construction wherein only one of the friction members 28 or 26 is used, and also, the one side of the convex stripe portion 24a of the inner gear 22a is made to contact directly with the perpendicularly smooth surface of the inner radial portion or the pressing member 20 which faces the one side surface in opposition which is the other construction.

Figure 5:
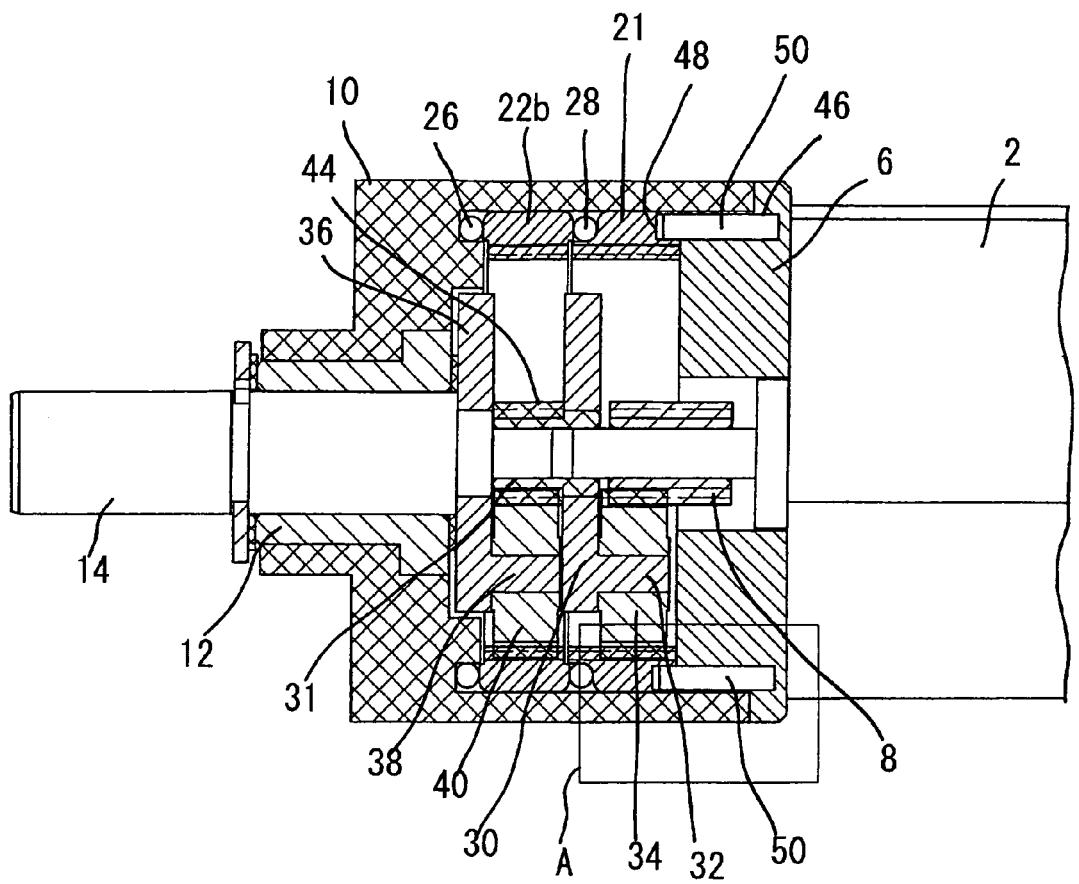
FIG. 5 is a cross section showing another embodiment of the planetary gear type reduction gear with torque limiter according to the present invention.
Figure 6:
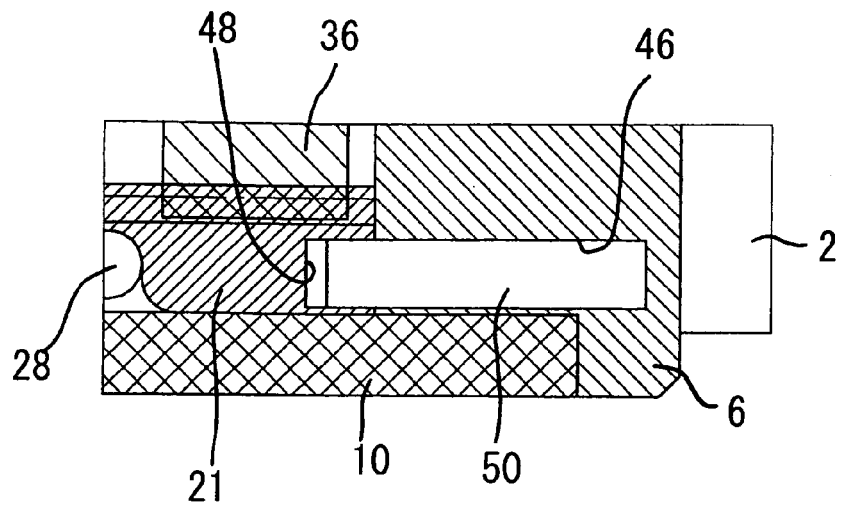
FIG. 6 is an enlarged cross section of a portion A of the planetary gear type reduction gear with torque limiter as shown in FIG. 5.

The other embodiment of the present invention is described in the following by referring to FIG. 4 through FIG. 6.

Figure 4:
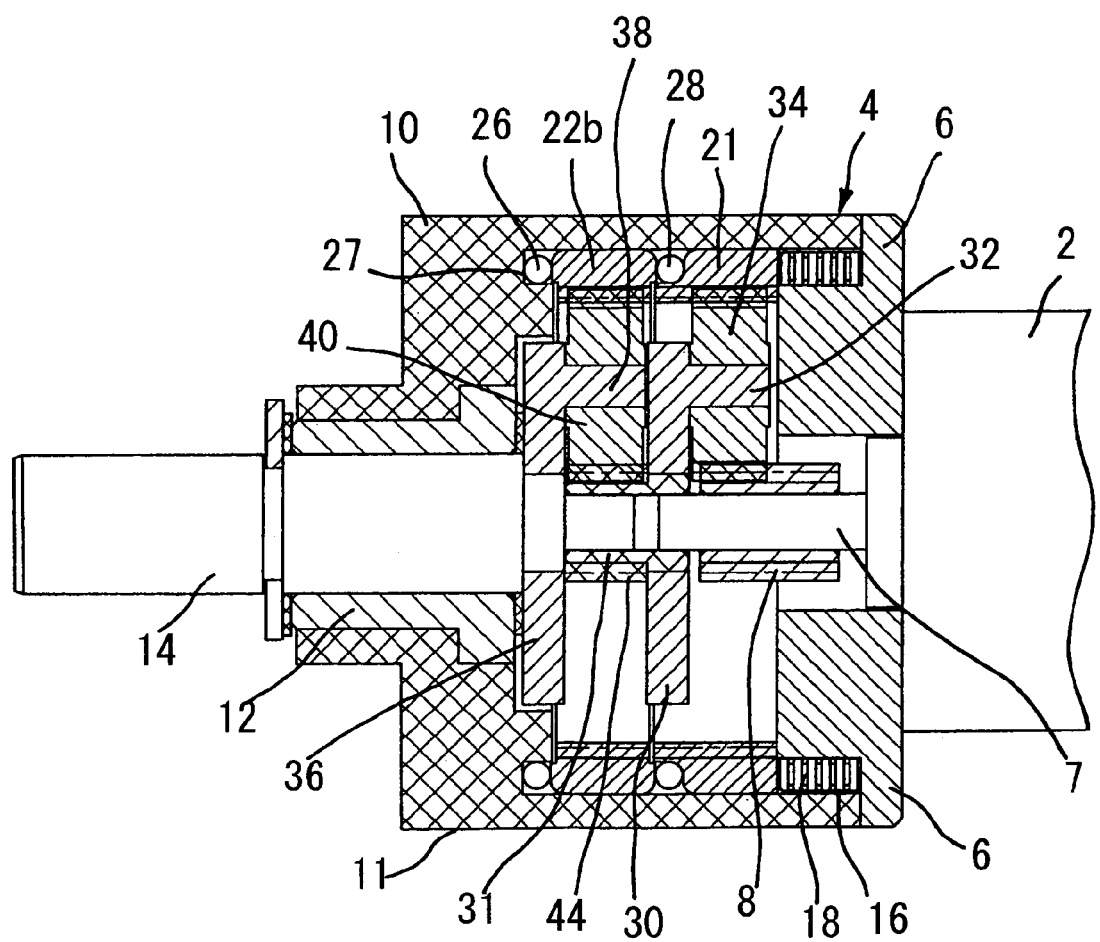
FIG. 4 is a cross section showing another embodiment of the planetary gear type reduction gear with torque limiter according to the present invention.

FIG. 4 shows an embodiment wherein a torque limiter is provided at the second stage of the two stage reduction gear and in the drawing, numeral 2 denotes a reduction gear device, and a cover 6 of a planetary gear type reduction gear 4 with torque limiter is fixed to its case. A central gear 8 is fixed to an input shaft 7, which is an output shaft 2 of the reduction gear 2.

Numeral 10 denotes a case of the reduction gear 4, and a bearing 12 is fixed to its radial portion, and the bearing 12 is rotatably journaled on the output shaft 14. The cover 6 is fixed to the case 10, and the cover 6 and the case 10 form the stationary member 11. On the outer periphery of the cover 6, a plurality of holding holes 16 extending in the axial direction of the stationary member 11 are bored at almost equal intervals in the circumferential direction, and a coil spring 18 is inserted and disposed in each holding hole 16. Numeral 21 denotes an inner gear 22 of a ring type, and inner teeth are formed on the inner periphery of the proper, and the outer periphery of the proper is slidably fit on the inner periphery of the case 10.

The one side of the inner gear 21 makes elastic contact with the coil spring 18, and the side surface is energized by the coil spring 18 in the axial direction of the stationary member 11 namely its right and left direction in the drawing. A plurality of pin holes 48 extend in the axial direction at almost equal intervals in the circumferential direction as shown in FIGS. 5 and 6 are formed on the proper of the inner gear 21, and a pin 50 disposed in the holding hole 46 at the side of the cover 6 is slidably inserted in the pin hole 48, and by this construction, the inner gear 21 is engaged with the stationary member 11 and relative rotation is prevented.

Numeral 22b shows a ring-like inner gear, and the inner gear 22b is disposed at an interval in the radial direction from the stationary member 11. Namely, the outer periphery of the proper of the inner gear 22b is inserted and disposed at a slight interval on the inner peripheral surface of a thin wall portion of the case 10. Numerals 26 and 28 denote friction members made of O-rings provided with elasticity and friction surfaces. The O-rings are disposed on opposite sides of the inner gear 22b in the axial direction, and the friction members 26, 28 exert pressure in the axial direction against the inner gear 22b, and thereby the inner gear 22b is retained at the side of the stationary member 11 by the friction force between the friction members 26, 28 and the side of the stationary member 11 and by the friction force between the friction members 26, 28 and the inner gear 22b.

The friction member 26 is disposed in a compressed condition between the engaging surface, which is perpendicular to the axial direction, of a concave groove 27 formed in a ring form on the radial portion of the case 10 and the one side of the inner gear 22b, and the friction member 28 is compressed and disposed between the other side of the inner gear 22b, and the side of the proper of the inner gear 21. The inner gear 22b is sandwiched in the axial direction of the inner gear 22b by the pressing force of the coil spring 18 and by the friction members 26, 28, and is retained at the side of the stationary member 11 by means of the friction members 26, 28 with the sandwiching force in the axial direction.

Numeral 30 denotes a first carrier rotatably journaled on the input shaft 7 and the output shaft 14, and the planetary gear 34 is rotatably journaled on the carrier pin 32. The one side of the planetary gear 34 is engaged with the inner teeth of the inner gear 21, and the other side is meshed with the central gear 8. The inner gear 22b makes the slip rotation against the case 10 by resisting the friction holding force of the friction members 26, 28 when the load torque beyond a predetermined value is applied from the output shaft 14 side so as to stop the output shaft 14, and while the load torque does not reach a predetermined size, the inner gear 22b maintains a non-rotating condition against the case 10 by the friction holding force of the friction members 26, 28.

The friction holding force that keeps the inner gear stationary can be adjusted by selecting the coil spring 18 so as to have a different elastic modulus. Also, the friction holding force that holds the inner gear 22 in slip rotatable condition at the side of the stationary member 11 can be changed by changing to O-rings 26, 28 formed of friction materials of different friction coefficient, and other methods can be considered.

The tubular sliding bearing 31 is fixed to the hole bored in the disc portion of the carrier 30, and the sliding bearing 31 is rotatably fit on the small diameter portion of the output shaft 14 disposed in opposition on an identical axis with the input shaft. The center axis line of the input shaft 7 and the output shaft 14 coincide with the axis of the inner periphery of the case 10, and the carrier 30 is formed rotatably with the axis as the pivot. The central gear 44 is formed integrally on the outer periphery of the sliding bearing 31. A second carrier 36 is fixed to the output shaft 14, and the planetary gear 40 is rotatably journaled on the carrier pin 38. One side of the planetary gear 40 is meshed with the inner teeth of the inner gear 22b, and the other side is meshed with the central gear 44.

In the foregoing construction, when the input shaft 7 turns, the central gear 8 turns at the same speed, and this rotation is transmitted to the planetary gear 34. The planetary gear 34 rotates with the carrier pin as the rotating axis, and revolves with the axis of the inner rotating axis, and revolves with the axis of the inner periphery of the case 10 as the pivot along the inner gear 21. When the planetary gear 34 revolves, the carrier 30 rotates with the axis of the inner periphery of the case 10 and the central gear 44 rotates. By the rotation of the central gear 4, the planetary gear 40 rotates with the carrier pin 39 as the rotating axis, and revolves along the inner gear 22b. When the planetary gear 40 revolves, the second carrier 36 rotates, and the output is produced from the output shaft 14 which is reduced at a predetermined reduction ratio.

On the other hand, when a load of more than the slip torque is applied to the output shaft 14 so that the output shaft 14 is stopped, the revolving motion of the planetary gear 40 is stopped by the load. The rotary torque of the planetary gear 40 works on the inner gear 22b with the carrier pin 38 as the pivot. The inner gear 22b, which is meshed with the gear 40, makes the slip rotation along the inner periphery of the case 10 by resisting the friction holding force caused by the friction members 26, 28. The DC motor is not worked with the overload due to the slip rotation.

In this embodiment, similar to the embodiments, the construction is not limited to a construction wherein the friction members 26, 28 are disposed in opposition at both sides of the inner gear 22b in the axial direction, and one friction member 28 or 26 only is sufficient, and a construction wherein the one side of the inner gear 22b is caused to directly contact the smooth surface perpendicular in the axial direction of the inner radius of the case 10 facing the one side or the smooth side of the inner gear 21 can be employed.

Another embodiment of the present invention is described in the following by referring to FIG. 7.

Figure 7:
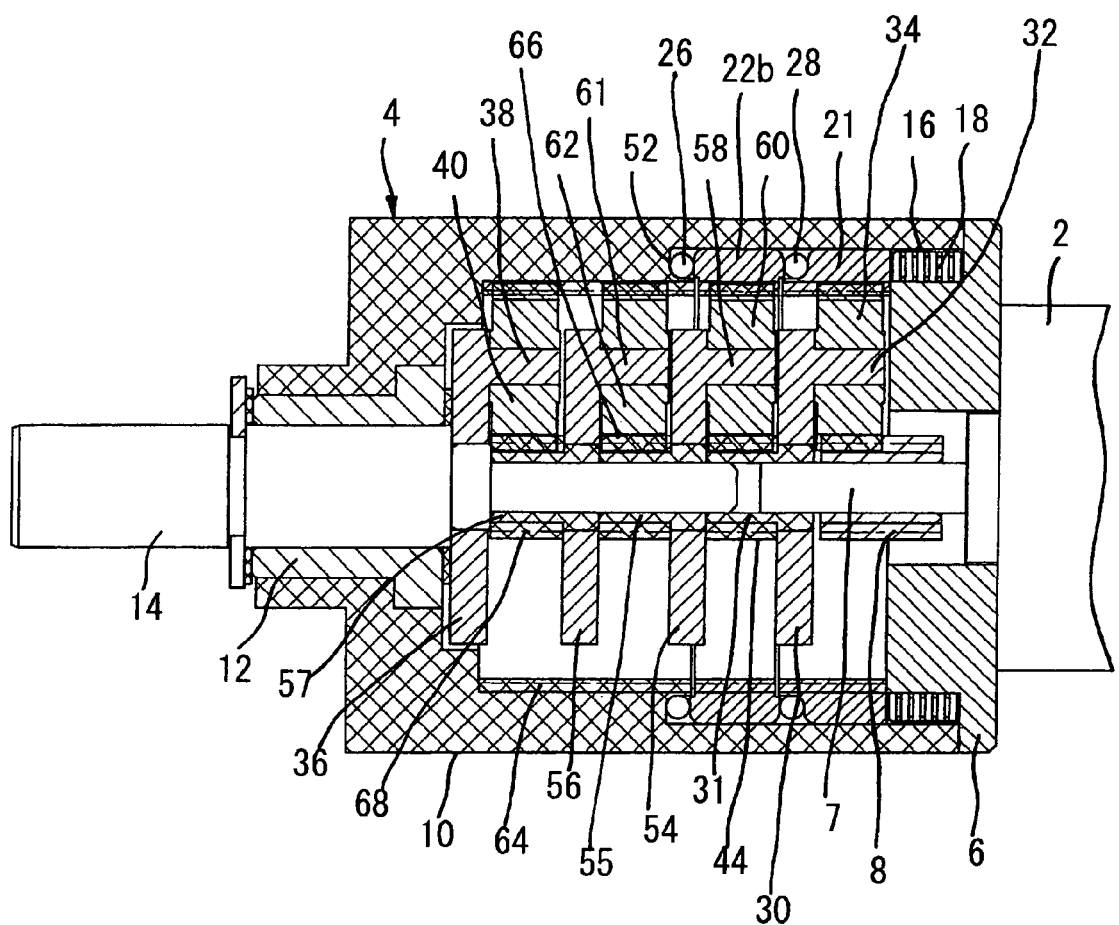
FIG. 7 is a cross section showing another embodiment of the planetary gear type reduction gear according to the present invention.

FIG. 7 shows an embodiment wherein a torque limiter is provided at the second stage of a four stage reduction gear, and in the drawing, numeral 2 denotes a reduction gear (DC motor), and a cover of the planetary gear type reduction gear 4 with torque limiter is fixed to the case of the DC motor. The central gear 8 is fixed to the input shaft 7 that is the output shaft of the reduction gear 2. Numeral 10 denotes a case 10, and a bearing 12 is fixed to its radial portion, and an output shaft 14 is rotatably journaled to the bearing 12. The cover 6 is fixed to the case 10, and the cover 6 and the case 10 form the stationary member 11. On the outer periphery of the cover 6, a plurality of holding holes 16 are bored at almost equal intervals in the circumferential direction, and the holding holes extend in the axial direction of the stationary member 11. A coil spring 18 is inserted into each holding hole 16. Numeral 21 denotes a ring-like inner gear, and inner teeth are formed on an inner periphery of its proper, and the outer periphery of the proper fits slidably on the inner periphery of the case 10. One surface of the inner gear 21 elastically contacts the coil spring 18, and the energization is applied by the coil spring 18 in the axial direction of the stationary member 11 which is the right and left direction in the drawing.

A plurality of pin holes extending in the axial direction are formed on the proper of the inner gear 21 at almost equal intervals in the circumferential direction which extends in the axial direction, and the pins are inserted in the pin holding holes at the side of the cover 6, and by this construction, the rotation of the inner gear 21 against the stationary member 11 is engaged. Numeral 22b shows a ring-like inner gear, and the inner gear 22b is disposed at an interval from the stationary member 11 in the radial direction.

Namely, the outer periphery of a proper of the inner gear 22b is inserted and disposed at a slight interval from the inner periphery of a thin wall portion of the case 10.

Numerals 26, 28 denote friction members made of O-rings that are provided with elasticity and friction surfaces, and they are disposed in opposition at opposites sides of the inner gear 22b in the axial direction, and the friction members 26, 28 apply pressure to the inner gear 22b in the axial direction. The inner gear 22b is retained at the side of the stationary member 11 by the friction force between the friction members 26, 28 and the stationary member 11 and the friction force between the friction members 26, 28 and the inner gear 22b pressed by the pressing member. The friction member 26 is compressed and disposed between the engaging surface 52, which is perpendicular to the axial direction, formed on the inner radial portion of the case 10 and one side of the inner gear 22b. The friction member 28 is compressed and disposed between the other side of the inner gear 22b and the side of the proper of the gear 21.

The inner gear 22b is sandwiched by the pressing force of the coil spring 18 in the axial direction of the inner gear 22b by the friction members 26, 28 at both surfaces by means of the inner gear 21, and the inner gear 21 is retained by means of the friction members 26, 28 which exert a sandwiching force in the axial direction. Numeral 30 denotes a first carrier rotatably journaled on the input shaft 7 and the output shaft 14, and the planetary gear 34 is rotatably journaled on the carrier pin 32.

One side of the planetary gear 34 is meshed with the inner teeth of the inner gear 21, and the other side is meshed with the central gear 28. When the inner gear 22b is subjected to a load torque exceeding a predetermined load from the side of the output shaft 14 such that the output shaft 14 is stopped, the inner gear 22b makes a slip rotation against the case 10 by resisting the friction holding force of the friction members 26, 28, and in the condition where the load torque does not reach a predetermined value, the inner gear 22b is retained in a non-rotating condition relative to the case 10.

The friction holding force for maintaining the inner gear 22b in the non-rotating condition relative to the stationary member 11 can be adjusted by selecting a coil spring 18 having a different elastic modulus. Also, the friction holding force that holds the inner gear 22b to the stationary member 11 side in slip rotating possible condition can be changed by changing the O-rings 26, 28 with O-rings formed of a material having a different friction modulus, and other methods can be considered.

The sliding bearing 31 of tubular type is fixed to the hole bored in the disc portion of the carrier 30, and the sliding bearing 31 is rotatably fitted to a small diameter portion of the output shaft 14 disposed in opposition to the input shaft which are coaxially arranged. The center axis line of the input shaft 7 and the output shaft 14 coincides with the axis of the inner periphery of the case 10, and the carrier 30 is constructed so as to be rotatable about the axis.

The central gear 44 is formed integrally on the outer periphery of the sliding bearing 31. The output shaft 14 is rotatably journaled in the second carrier 54 and the third carrier 56 by means of the sliding bearings 55, 57, and the fourth carrier 36 is fixed to the output shaft 14. The planetary gear 60 is rotatably journaled on the carrier pin 58 of the carrier 54. The one end of the planetary gear 60 is meshed with the inner gear 22b, and the other end is meshed with the central gear 44 fixed to the tubular portion of the carrier 30.

The planetary gear 62 is rotatably journaled on the carrier pin 61 of the carrier 56. One end of the planetary gear 62 is meshed with the ring-type inner gear 64 formed integrally with the inner radial portion of the case 10, and the other end is meshed with the central gear 66 formed on the sliding bearing 55 fixed to the carrier 54. The planetary gear 40 is rotatably journaled on the carrier pin 38 of the carrier 36. One side of the planetary gear 40 is meshed with the inner teeth of the inner gear 64, and the other side is meshed with the central gear 68 formed on the sliding bearing 57 fixed to the carrier 56. The inner gear 22b is formed as a separate body from the case 10 and the inner gear 22b may be fixed to the case so as not to be rotatable.

The friction holding force that holds the inner gear 22b at the stationary member 11 side in the non-rotating condition can be adjusted by the selection of a coil spring having a different elastic modulus. Also, the friction holding force that holds the inner gear 22b to the side of the stationary member 11 in the non-rotating condition can be changed by changing the material forming the O-rings with a material having a different friction modulus, and also, other methods may be employed.

In the foregoing construction, when the input shaft 7 rotates, the central gear 8 rotates at the same speed, and this rotation is transmitted to the planetary gear 34. The planetary gear 34 revolves with the carrier pin 32 as a rotating axis, and revolves along the inner gear 21.

When the planetary gear 34 revolves, the carrier 30 rotates and the planetary gear 44 rotates. When the gear 44 rotates, the planetary gear 66 rotates with the carrier pin 58 as the rotating axis, and revolves along the inner gear 22b.

When the planetary gear 60 revolves, the second carrier 54 rotates and the central gear 66 rotates. When the central gear 66 rotates, the planetary gear 62 rotates with the carrier pin 61 as the rotating axis, and revolves along the inner gear 64. When the planetary gear 62 revolves, the carrier 56 rotates, and the planetary gear 68 rotates. When the central gear 68 rotates, the planetary gear 40 rotates with the carrier pin 38 as the rotating axis and revolves along the inner gear 64. When the planetary gear 40 revolves, the fourth carrier 36 rotates, and the output that is reduced to a predetermined reduction speed is produced from the output shaft 14.

On the other hand, when the output shaft 14 is stopped or the like by some reason, and the load above a predetermined value namely the load above the slip torque is applied to the output shaft 24, the rotations of the carriers 36, 56, 54 are stopped by the load.

The rotary torque of the planetary gear 60 is worked on the inner gear 22b with the carrier pin 58 as the pivot. The inner gear 22b makes a slip rotation along the inner periphery of the case 10 by resisting the sandwiching friction holding force by the friction members 26, 28. The inner gear 22b is meshed with the planetary gear 60, and thus, the overload is not worked on the DC motor.

The planetary gear 60 is firmly supported at a position with a fixed interval in the radius direction relative to the axis of the case 10 or the central axis of the input shaft 7 and the output shaft 14 by the sliding bearing 31. For this reason, when the inner gear 22b makes a slip rotation by the rotation of the planetary gear 60, which is meshed with the inner gear 22b, the locus of the rotation becomes a true circle centering with the axis of the case 10, and the slip surface of the inner gear 22b with the friction members 26, 28 or the side of the case 10 forms a locus of almost a certain constant. By this arrangement, the contact pressure of the inner gear 22b with the friction members 26, 28 or the side of the case 10 does not change, accordingly, the transmitting torque of the inner gear 22 is always constant and there is no chance of causing a dispersion. Even in this embodiment, similar to the foregoing embodiment, there is no limitation to the construction wherein the friction members 26, 28 are disposed in opposition at both sides of the inner gear 22b in the axial direction, and one friction member 28 or 26 only or the one side of the inner gear 22b is caused to contact the smooth surface perpendicular to the inner radial portion of the case 10 facing the one side surface or the smooth side of the side surface or the smooth side surface of the inner surface may be employed.

For reference, in the foregoing embodiment, the reason for constructing the torque limiter mechanism in the inner gear of the first stage or the second stage of the planetary gear type reduction gear is that it is advantageous to obtain in the portion near the input side as close as possible, and its miniaturization is possible. Namely, when the O-rings forming the friction members 26, 28 are exchanged with O-rings formed of materials of different friction resisting force, a torque limiter of different transmission torque can be formed. Also, when the pressing means is exchanged with a material having a different energizing force, a torque limiter of different transmitting torque can be easily formed.

Figure 8:
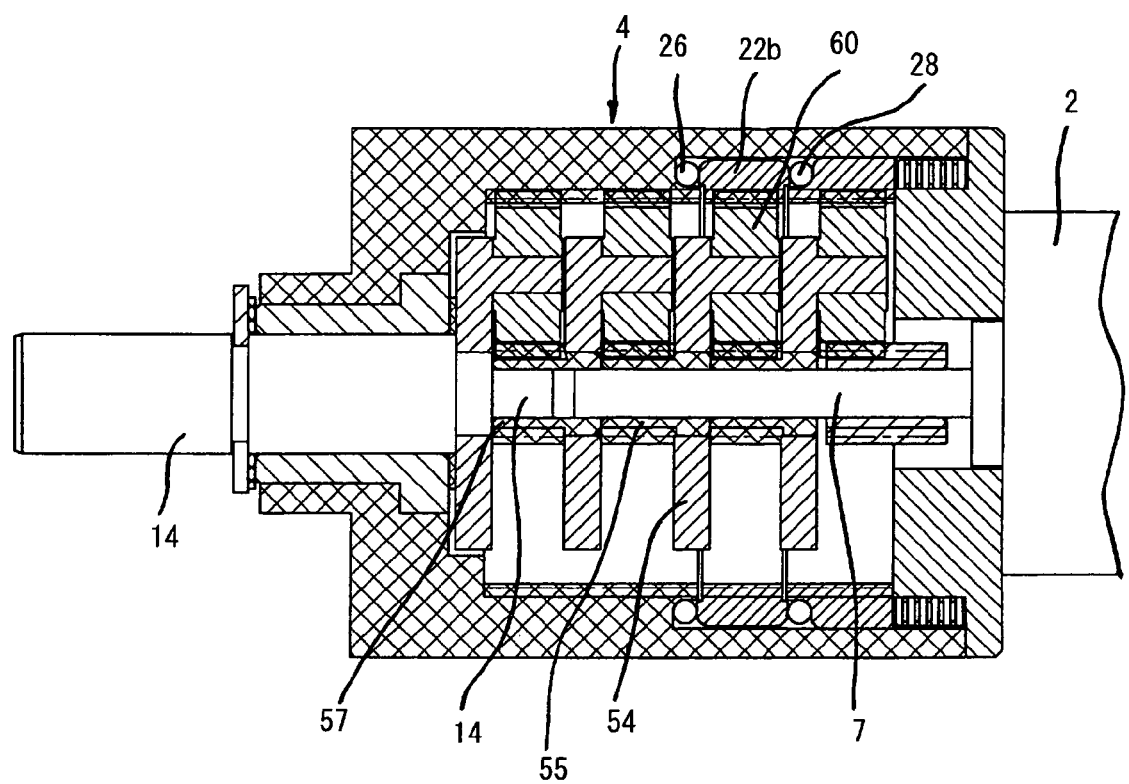
FIG. 8 is a cross section showing another embodiment of the planetary gear type reduction gear with torque limiter according to the present invention.

In the embodiments shown in FIG. 2 and FIG. 3, the carrier 30 journalizing the planetary gear 34 meshed with the inner gears 22, 22a constituting the torque limiter is supported by the bearing rotatably at both of the input shaft 7 and output shaft 14, and in the embodiment shown in FIG. 7, the carrier 54 journalizing the planetary gear 60 meshed with the inner gear 22b constituting the torque limiter is supported by the bearing rotatably on the output shaft 14, but as shown in FIG. 8, the carrier 54 journalizing the planetary gear 60 meshed with the inner gear 22b constituting the torque limiter may be rotatably journalized on the input shaft 7. The other construction as shown in FIG. 8 is identical with the construction of the embodiment shown in FIG. 7.

In the construction wherein the input shaft and the output shaft are coaxially opposed and disposed, and the input shaft and the output shaft are journalized on the connecting member, and the carrier journalizing the planetary gear meshed with the inner gear constituting the torque limiter is journalized rotatably on the input shaft, and in this construction, the input shaft is journalized at the stationary member (the cover 6 is integral with the case 10) so that the carrier is not eccentrically rotated relative to the stationary member, and accordingly, the revolution of the planetary gear journalized on the carrier pin of the carrier does not perform the eccentric rotation relative to the stationary member. Namely, as the inner gear meshed with the planetary gear does not make the eccentric rotation, the slip condition of the friction member between the inner gear and the stationary member side has no dispersion and is stable.

Furthermore, in the construction wherein the input shaft and the output shaft are coaxially opposed and disposed and the input shaft and the output shaft are journalized by the connecting member, and the carrier journalizing the planetary gear meshed with the inner gear constituting the torque limiter is formed integrally with the connecting member, and with this arrangement, the input shaft and the output shaft are rotatably journalized, the input shaft and the output shaft are journalized by the bearing without the eccentricity, and since the carrier is supported by the input shaft and the output shaft, the carrier does not make the eccentric rotation relative to the stationary member side. Accordingly, the revolution of the planetary gear journalized on the carrier pin of the carrier does not make the eccentric rotation relative to the stationary member. Namely, as the inner gear, which is meshed with the planetary gear, does not make the eccentric rotation relative to the stationary member side, the slip condition of the friction member between the inner gear and the stationary member side has no dispersion among the products, and is stable.

In the construction wherein the input shaft and the output shaft are journalized by the connecting member and the carrier journalizing the planetary gear meshed with the inner gear constituting the torque limiter is rotatably journalized on the output shaft, the input shaft and the output shaft are journalized without the eccentricity by the bearing member, namely, the output shaft does not make the eccentric rotation relative to the input shaft. Since the carrier is supported by the output shaft, the carrier does not make the eccentric rotation relative to the stationary member, and accordingly, the revolution of the planetary gear journalized on the carrier pin of the carrier does not allow the eccentric rotation relative to the stationary member side so that the slip condition of the friction member between the inner gear and the stationary member side has no dispersion depending on the product and is stable.

The present invention will be described in the following in detail by referring to the attached drawings of another embodiment of the present invention.

Figure 9:
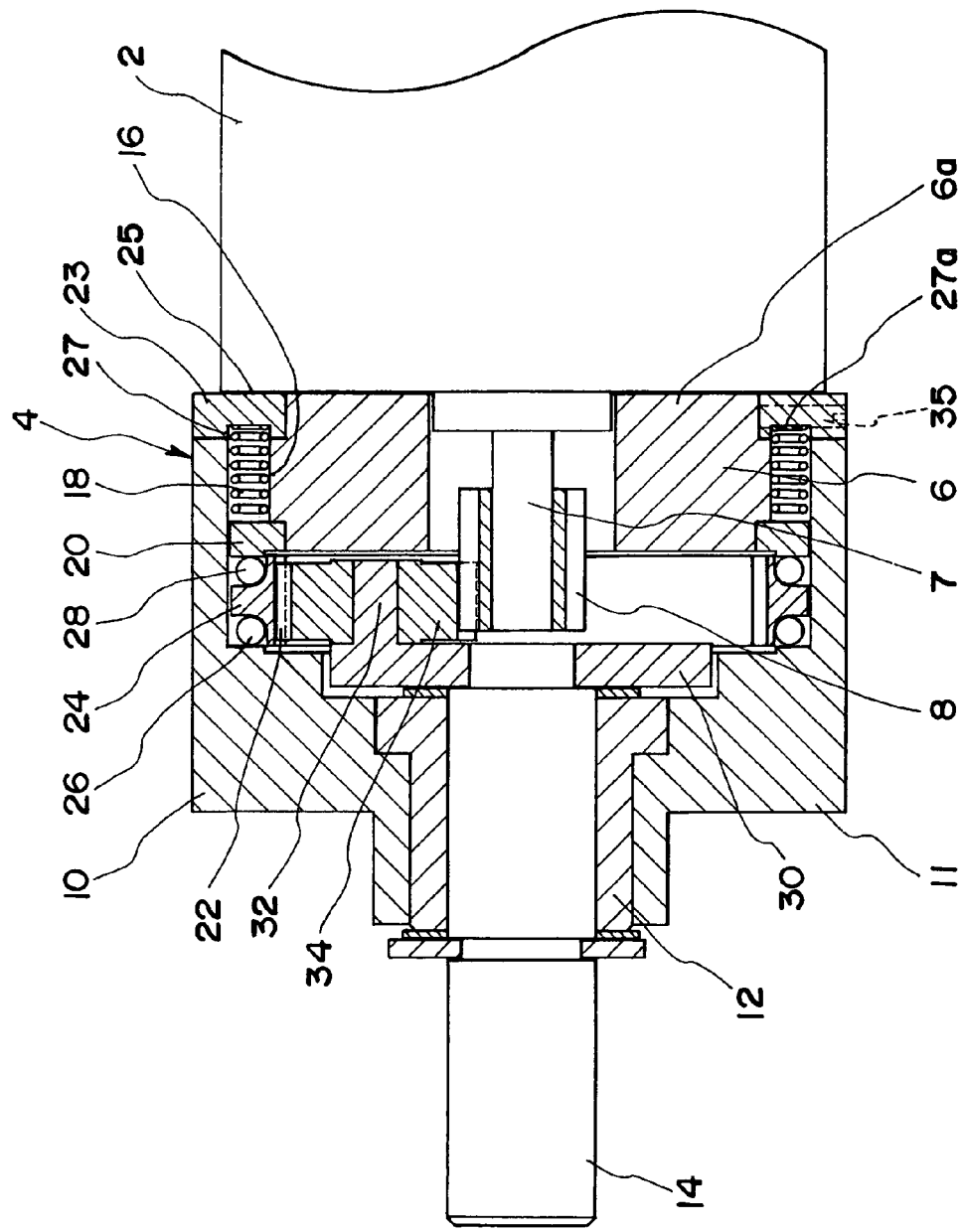
FIG. 9 is a cross section of the planetary gear type reduction gear with torque limiter according to another embodiment of the present invention.

FIG. 9 shows a mode of the embodiment wherein the torque limiter is mounted on the one stage reduction gear and in addition, the spring power adjusting means is installed, and in the drawing, numeral 23 denotes a ring-like spring power adjusting member, and its inside diameter portion fits rotatably on an outer peripheral surface of a tubular convex portion 6a formed on the cover 6. A concave groove 25 is formed in a ring-like shape by an exterior periphery of the tubular convex portion 6a, an end face of the case of the reduction device 2, an end face of the cover 6 with an opening for holding hole 16, and an end face of the case 10 over the border of the case 10 and the case of the reduction device 2, and both side surfaces of the spring power adjusting member 23 are rotatably sandwiched by both wall surfaces of the concave groove 25. Three cam grooves 27 formed on one side face 23a of the spring power adjusting member 23 as shown in FIG. 2 with a cam surface 27a with a slope relative to the side surface 23a along the circumferential direction at an angular difference of 120 degrees in mutually circumferential directions.

Figure 11:
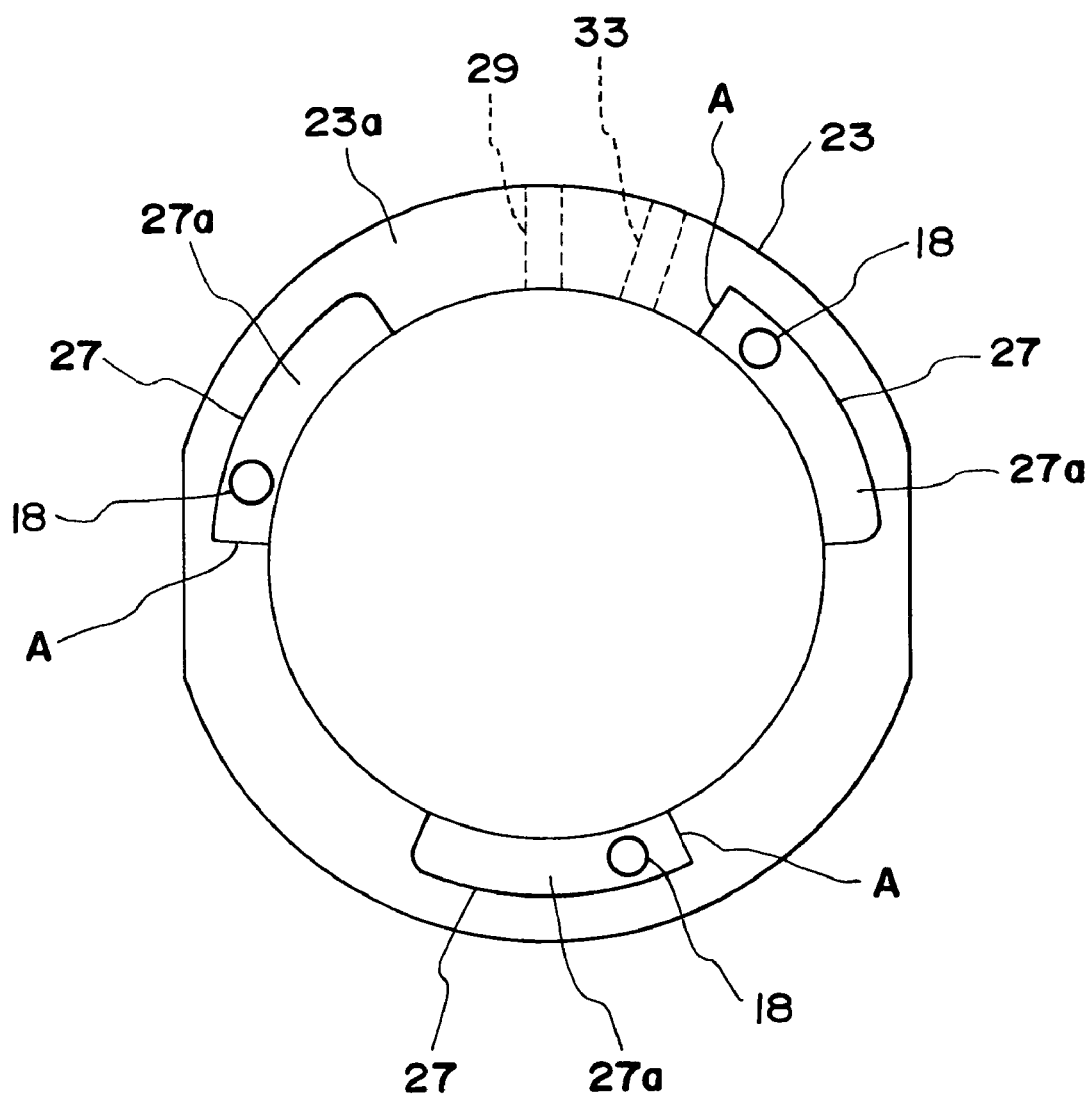
FIG. 11 is a side view drawing of the spring power adjusting member.

Each cam groove 27 has a mutually identical cam surface structure, and its number is equal to the number of the holding holes 16, and are disposed in opposition to the each holding hole 16. A coil spring 18 in the each holding hole 16 is in elastic contact almost perpendicularly to the cam face 27a of the corresponding cam groove 27. The abutting positions of the each coil spring 18 against the corresponding cam face 27a are set so that the positions are entirely identical without exception against the standard position A of each cam face 27a. Namely, in FIG. 11, the distance of three pieces of the coil spring 18 to the standard position A of each cam face 27a is set to be entirely identical.

Figure 12:
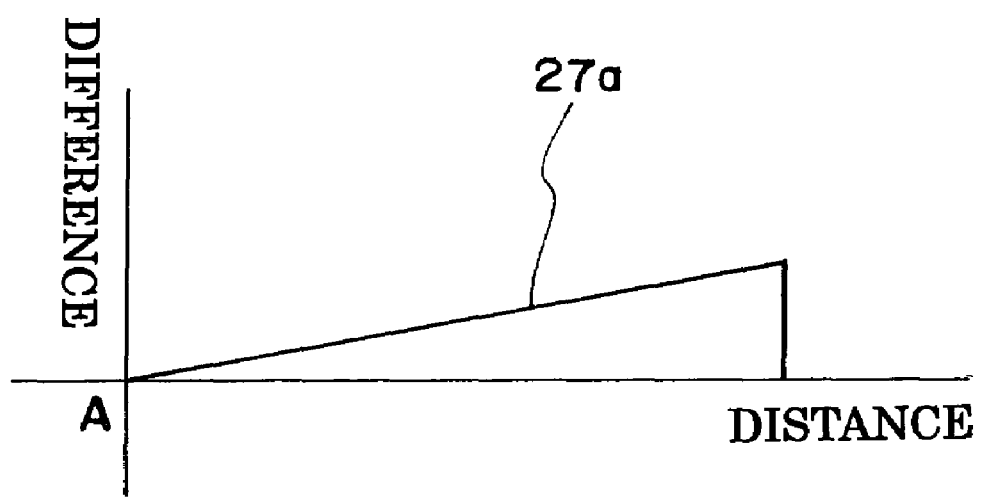
FIG. 12 is an explanatory drawing of the cam surface.

A difference in grade of the cam face 27a of the cam groove 27 against the side face 23a of the spring power adjusting member 23 is of a formation where its one end is set as the standard position A, as shown in FIG. 12, and increases linearly in a circumferential direction. For reference, the slope of the cam face 27a against the side face 23a of the spring power adjusting member 23 can be varied, and the depth of the cam face 27a of the cam groove 27 is not particularly limited to a formation where the depth displaces linearly to the side face 23a. The spring power adjusting member 23 is bored with a hole 29 for insertion of a tool and a thread hole 33 for set screw 35 in order to allow its rotation manipulation, and one end of the thread hole 23 opens to the inner periphery of the spring power adjusting member 23, and the other end opens to the outer periphery of the spring power adjusting member 23.

The friction holding power for holding the inner gear 22 to the side of the stationary member 11 to permit slip rotation, namely, the limiter torque of the torque limiter can be adjusted by rotating the spring power adjusting member 23. Other constructions of the embodiment is similar to the construction of the embodiment shown in FIG. 1, and portions corresponding to the construction of FIG. 1 are given the identical codes, and their descriptions are omitted.

In the foregoing construction, when the input shaft 7 rotates, the central gear 8 rotates at the same speed, and this rotation of the gear 34 is transmitted to the planetary gear 34. The planetary gear 34 revolves and the carrier gear 30 rotates with the axis of the carrier pin 38 as the axis, and revolves along the inner gear 42. When the planetary gear 40 revolves, the secondary gear 36 rotates, and the output is produced from the output shaft 14 at a predetermined reduction ratio.

On the other hand, the load above a predetermined value, namely, the load above a slip torque is applied to the output shaft 14, the carrier 30 stops, and the rotary torque of the planetary gear 34 works on the inner gear 22 with the carrier pin 32 as a fulcrum. The inner gear 22 meshed with the planetary gear 34 by the rotary torque from the planetary gear 34 on the inner gear 22 with the carrier pin 32 makes a flip rotation along the inner periphery of the case 10 by resisting the pressure friction holding power by the friction members 26, 28. There is no chance that the overload is applied to the reduction gear device, namely, the DC motor by the slip rotation.

In order to adjust the limiter torque of the torque limiter to proper values, insert a spring power adjusting member 23, for example, a bar-like tool into a hole 29 for insertion of tool, and rotate it by an external manipulation such as manipulation of this tool, and relatively shift the abutting position against the cam surface 27a of the cam groove 27 of each coil spring 18. Each coil spring 18 changes the amount of compression of axial direction according to the amount of displacement of the depth of the cam groove 27, and the friction holding power for holding the inner gear 22 to the side of the stationary member 11 to keep a slip rotation, namely, the limiter torque changes. After the adjustment of the limiter torque, the set screw 35 is screwed into the thread hole 33 in the direction of clamping, and causes the tip of the set screw 35 to the outer periphery of the tubular convex portion 6a of the cover 6 and fixes the spring power adjusting member 23 to the cover 6. By the way, the spring power adjusting member 23 keeps a tight contact with the wall surface of the concave groove 25 by the elastic power from the coil spring 18, and during use, since the stress does not work in the rotating direction, the member 23 seldom moves in the rotating direction without working of the rotating power from the outside. For this reason, in this invention, a rotating stop mechanism against the spring power adjusting member 23 is not an indispensable construction.

The coil spring 18 forms a pressing means for applying the pressure to the friction members 26, 28 relative to the inner gear 22 in the axial direction, and the spring power adjusting member 23 having the cam surface 27a for receiving the elastic power of the pressing means forms the spring power adjusting means for changing the spring power of the pressing means.

Another embodiment of the present invention will be described in the following by referring to FIG. 13.

Figure 13:
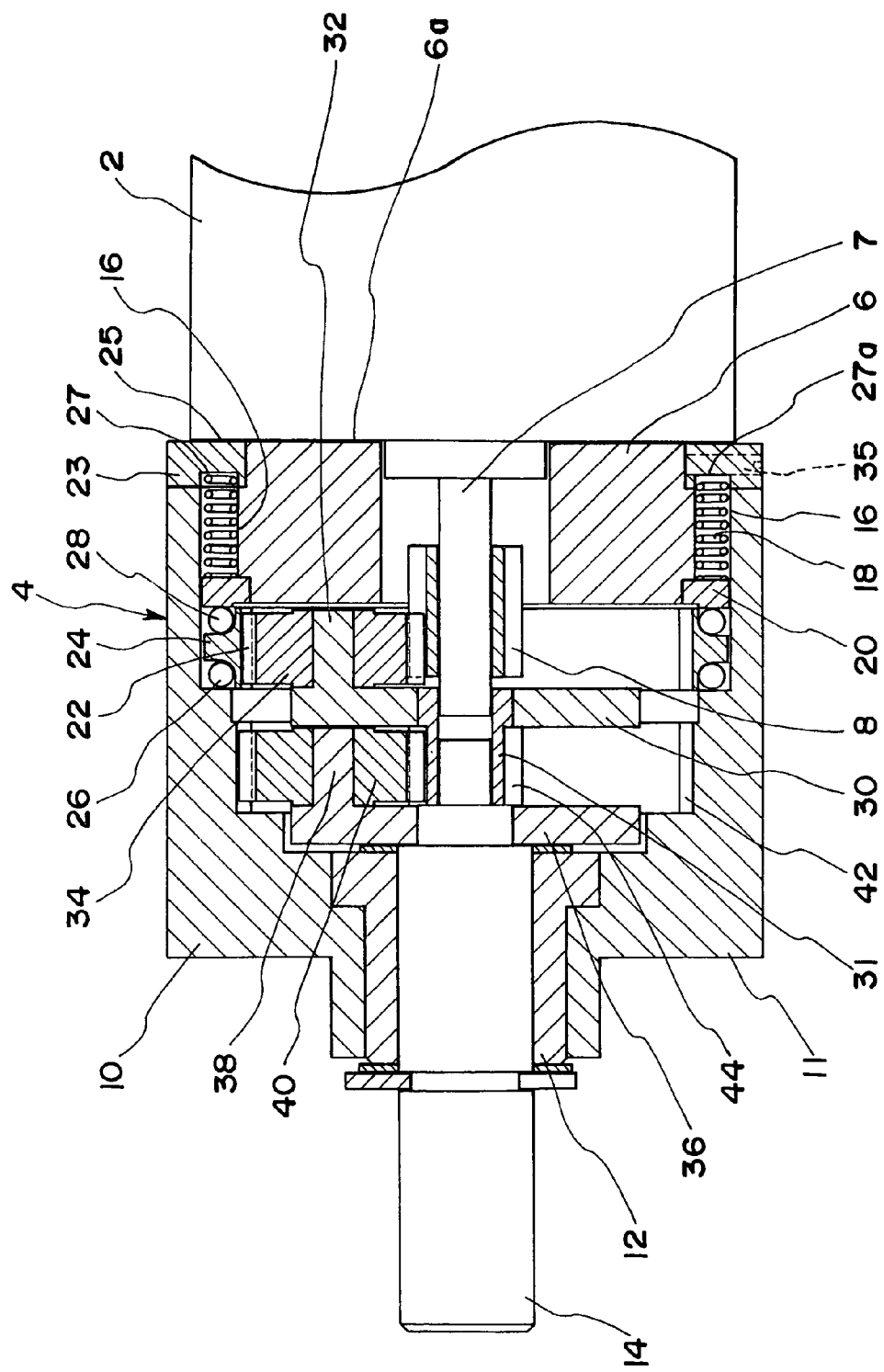
FIG. 13 is a cross section of the planetary gear type reduction gear with torque limiter according to the other embodiment of the present invention.

FIG. 13 shows the embodiment wherein a torque limiter is provided at the first stage of the two stage reduction gear and also, is provided with the spring power adjusting means, and in the drawing, numeral 23 denotes a ring-like spring power adjusting member, and its radial portion fits rotatably on the outer periphery of the tubular convex portion 6a formed on the cover 6. A ring-like concave groove 25 is formed in the border of the case 10 and the case of the reduction device 2 which is formed by the outer periphery of the tubular convex portion 6a, the end face of the case of the reduction device 2, and the end face of the cover 6 to which the holding hole 16 opens and the end face of the case 10, and both the side surfaces of the spring power adjusting member 23 are rotatably sandwiched by both wall surfaces of the concave groove 25.

Figure 10:
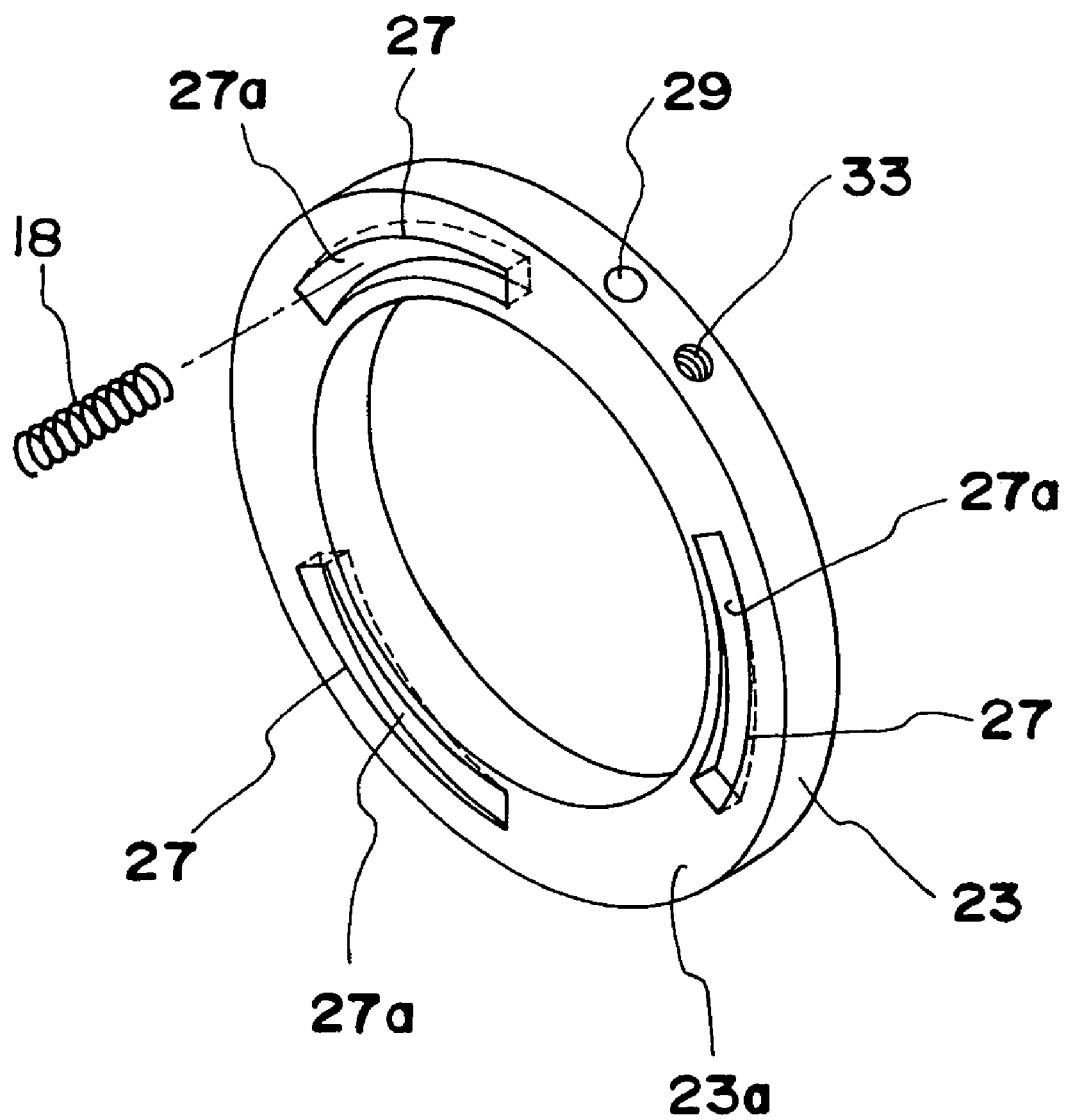
FIG. 10 is an exterior view drawing of the spring power adjusting member.

Three cam grooves 27 are each formed with cam face 27a with a slope against the side face 2a. The cam grooves 27 are formed at an angular difference of 120 degrees in the circumferential direction mutually along the one side face of the spring power adjusting member 23 as shown in FIG. 10. Each cam groove 27 has an identical cam face structure mutually, and the number of cam grooves is identical with the number of the holding holes 16, and the cam grooves are disposed in opposition to the holding holes 16, respectively.

The coil spring 18 in each holding hole 16 is in almost perpendicular contact with the cam face 27a of the corresponding cam groove 27.

The spring power adjusting member 23 is bored with a hole for insertion of tool, and a set screw for set screw 35 for turning manipulation of the member 23. The construction of the spring power adjusting means is identical with the construction of the spring power adjusting means used in the embodiment shown in FIG. 9. Also, other constructions of the present embodiment are identical with the embodiment shown in FIG. 2, and identical codes are given to the construction of FIG. 2 and the corresponding portions, and its description is herein omitted. In the foregoing construction, when the input shaft 7 rotates, the central gear 8 rotates at the same speed, and this rotation is transmitted to the planetary gear 34. The planetary gear 34 rotates with the carrier pin 32 as the rotary axis, and as it is fixed to the side of the stationary member 11 by means of the friction members 26, 28, it revolves along the inner gear 22 with the axis of the inner periphery of the case 10 as a fulcrum. When the planetary gear 34 revolves, the carrier 30 rotates with the axis of the inner periphery of the case 10 as the shaft center, and the central gear 44 rotates.

The planetary gear 40 rotates with the carrier pin 38 as the rotary axis with the rotation of the central gear 44, and revolves along the inner gear 42. When the planetary gear 40 revolves, the second carrier 36 rotates, and the output is produced from the output shaft 14 at a predetermined reduction ratio.

On the other hand, when predetermined load, namely, the load above a slip torque is applied to the output shaft 14 due to some reason, the revolving motion of the planetary gear is stops due to the load, and the carrier 30 meshed with the planetary gear 40 by means of the central gear 44 stops, and the rotation torque of the planetary gear 34 works on the inner gear 22 with the carrier pin 32 as the fulcrum, and the inner gear 22 meshed with the planetary gear 34 makes a slip rotation along the inner periphery of the case 10 by resisting the sandwiching friction holding power of the friction members 26, 28 which is caused by the rotation torque from the planetary gear 34.

There is no chance that the overload is applied to the DC motor by the slip rotation.

The operation of adjusting the limiter torque by rotating the spring power adjusting member 23 is identical with the embodiment shown in FIG. 9, and its description is herein omitted.

Another embodiment of the present invention will be described in the following by referring to FIG. 14.

Figure 14:
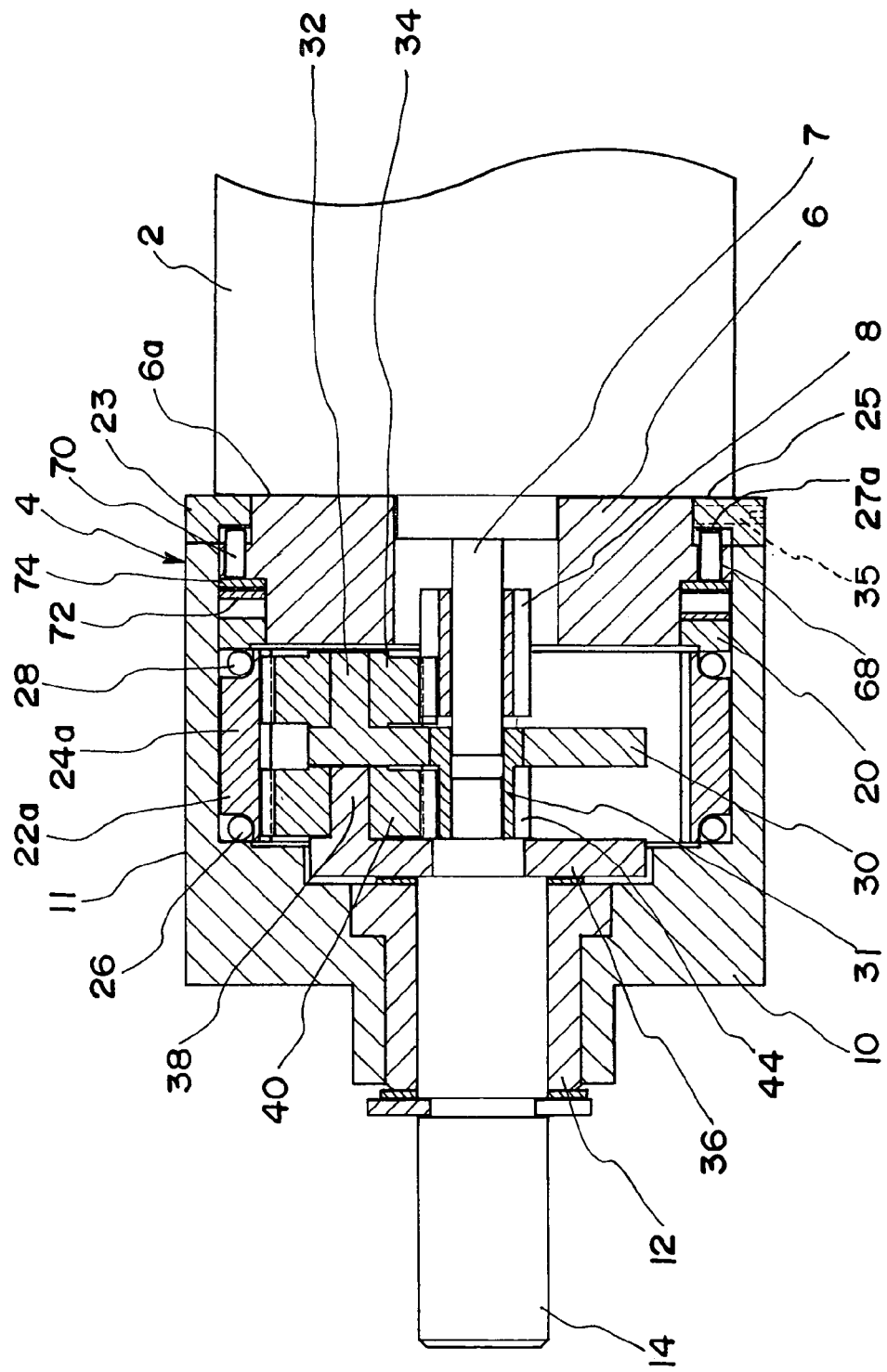
FIG. 14 is a cross section of the planetary gear type reduction gear with torque limiter according to the other embodiment of the present invention.

FIG. 14 shows the embodiment wherein a torque limiter is provided at the first stage and the second stage of the two stage reduction gear, and also, the spring power adjusting means is provided, and in the drawing, reference numeral 23 denotes the ring-like spring power adjusting member, and its radial portion fits rotatably with the outer periphery of the tubular convex portion 6a formed on the cover 6.

The spring power adjusting member 23 has a structure that is identical with that of the spring power adjusting member in the embodiment of FIG. 9. A ring-like concave groove 25 is formed in the border of the case 10 and the case of the reduction device by the outer periphery of the tubular convex portion 6a, the end face of the case of the reduction device and the end face of the cover 6 to which the pin holding hole 68 opens and the end face of the case 10, and both side surfaces of the spring power adjusting member 23 are rotatably sandwiched by both the wall surfaces of the concave groove 25.

Figure 15:
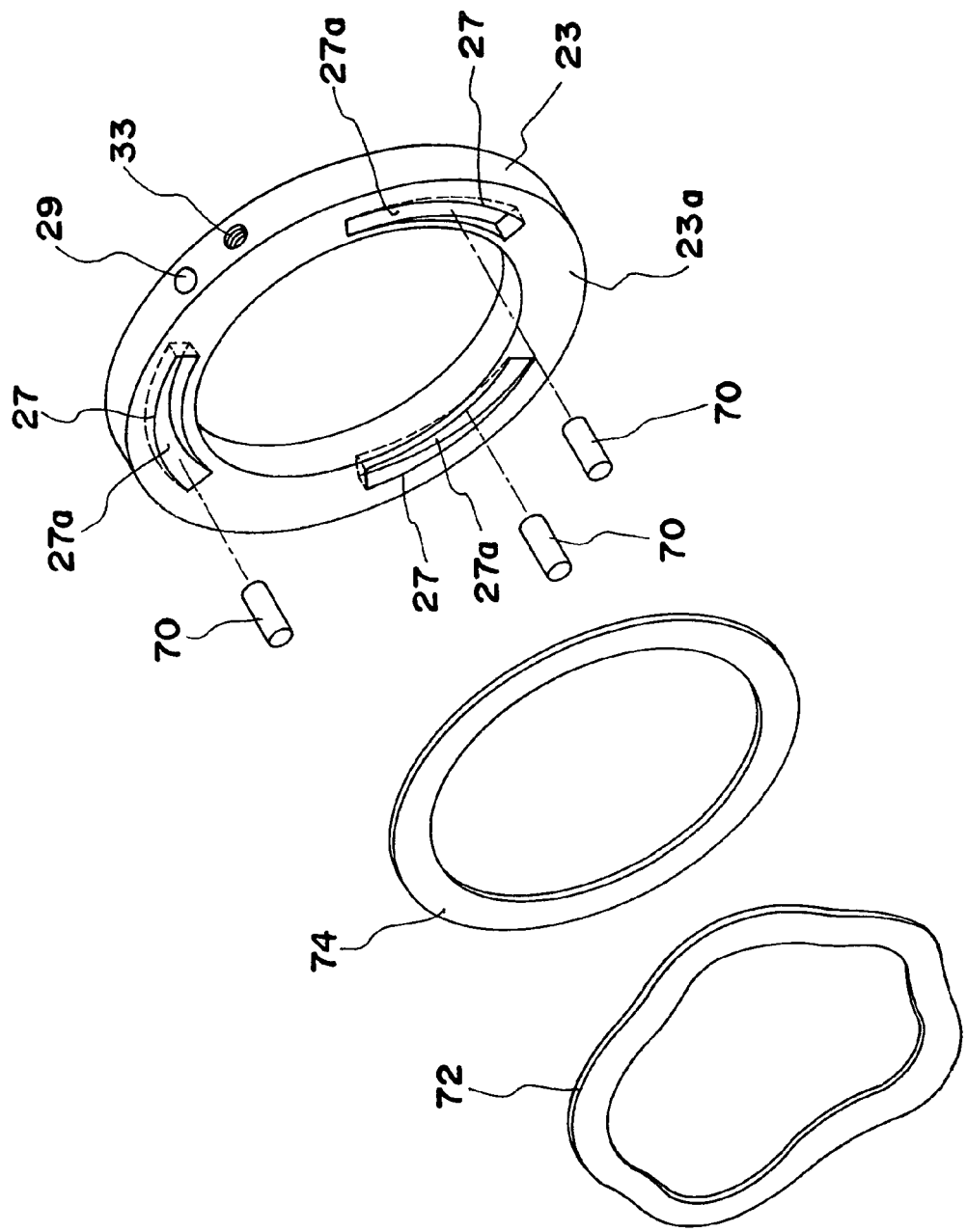
FIG. 15 is an exterior view drawing showing the other embodiment of the present invention.

On side surface 23a of the spring power adjusting member 23, as shown in FIG. 15, the cam surface 27a having a slope relative to the side surface 23a along the circumferential direction is formed with a angular difference of 120 degrees mutually in the circumferential direction.

Each cam groove 27 has an identical cam surface structure, and the number of cam grooves is the same as the number of the pin hole holding holes 68. The cam grooves are disposed in opposition to the holding holes 68. The pin 70 in the each holding hole 68 is in almost perpendicular contact with the cam surface 27a of the corresponding cam groove 27. The abutting position of each pin 70 against the corresponding cam surface 27a is set to be entirely identical with respect to standard position of the each cam surface 27a. This cam groove 27 is identical with the cam groove 27 of the first embodiment. On the spring power adjusting member 23, the hole 29 for insertion of a tool, and the screw hole 33 for the set screw 35 are bored for its rotational manipulation. Each other end of the each pin 70 whose one end is in elastic contact with the corresponding cam surface 27a is in elastic contact with the leaf spring 72 by means of the ring-like plate 74 inserted and disposed slidably in the axial direction on the outer periphery of the cover 6.

Other constructions of the present embodiment are identical with the construction of the embodiment shown in FIG. 3, and an identical code is attached to corresponding portion, and its description is herein omitted.

In the foregoing construction, when the input shaft 7 rotates, the central gear 8 rotates at the same speed, and this rotation is transmitted to the planetary gear 34. The planetary gear 34 rotates with the carrier pin 32 as its rotary axis, and revolves with the axis of the inner periphery of the case 10 as the axis along the inner gear 22a. When the planetary gear 34 revolves, the carrier 30 rotates with the axis of the inner periphery of the case 10 as the pivot, and the central gear 44 rotates. The planetary gear 40 rotates with the carrier pin 38 as the rotary axis by the rotation of the central gear 44, and revolves along the inner gear 22a.

The second carrier 36 rotates as the planetary gear 40 revolves and the output reduced at a predetermined reduction ratio is produced from the output shaft 14.

During the rotation of the input shaft 7 by the drive of the DC motor, the inner gear 22a receives the rotary torque of the planetary gear 34 with the carrier pin 32 as the pivot and the rotary torque of the planetary gear 40 with the carrier pin 38 as the pivot in the same rotating direction with the gear 34 according to the load worked on the output shaft 14. While the load applied to the output shaft 14 is within a predetermined size, the inner gear 22a does not slip due to the rotary torque from the planetary gears 34, 40 and maintains the condition where the gear 22a is fixed to the stationary member 11 by the holding power of the friction members 26, 28 without slipping due to the rotary torque from the planetary gears 34, 40.

On the other hand, when the load above a predetermined value, namely, the load above the slip torque is applied to the output shaft 14 such that the output shaft 14 is stopped due to certain reasons, the rotary torque against the inner gear 22a of the planetary gears 34, 40 increases due to this load, and the gear 22a starts the slip rotation by resisting the friction power by the friction members 26, 28. With the slip rotation, the rotation of the output shaft 14 stops, and the revolving motion of the planetary gear 40 is blocked. While, the rotation of the central gear 8 is transmitted to the planetary gear 34, and the planetary gear 34 rotates. When the planetary gear 34 rotate, the planetary gear 34 makes the revolving motion against the inner gear 22a, and the first carrier 30 rotates by the revolving motion, and this rotation is transmitted to the planetary gear 40, and the planetary gear 40 rotates with the carrier pin 38 of the second carrier 36 as the fulcrum. The inner gear 22a slips along the inner periphery of the case 10 by resisting to the friction power by the friction members 26, 28 and the slip rotation continues until the load worked on the output shaft 14 becomes below the slip torque 14 becomes the below the slip torque.

During the slip rotation of the inner gear 22a, the planetary gear 34 makes revolving motion against the inner gear 22a in a counter direction relative to the slip rotation of the inner gear 22a while making the rotation as the carrier pin 32 as fulcrum. The overloading of the DC motor can be prevented by the slip rotation of the inner gear 22a.

By the way, during the slip rotation of the inner gear 22a, the relative rotating motion of the planetary gear 34 that rotates at a high speed by interlocking with the central gear 8 against the inner gear 22a is reduced of its speed by the revolving motion in counter direction relative to the slip rotating motion of inner gear 22a against the stationary member 11. As a result, the relative rotating motion of the planetary gear 40 of the rear stage against the inner gear 22a which is reduced of its speed and the relative rotating motion of the planetary gear 34 against the inner gear 22a become an identical speed, and the inner gear 22a makes the slip rotation against the stationary member 11 by the rotation of two pieces of the planetary gears 40, 34.

The planetary gear 34 is firmly supported at a position with a fixed interval in a radial direction against the center axis of the input shaft 7 and the output shaft 14 which is the axis of the case 10 by the sliding bearing 31.

For this reason, when the inner gear 22a meshed with the planetary gear 40 and the planetary gear 34 makes the slip rotation by the rotation of those gears 40 and 34, the locus of the rotation becomes a true circle formed by centering with the axis of the case 10 as the pivot, and the slip surface of the inner gear 22a with the side of the friction members 26, 28 or the side of the case 10 forms an almost fixed locus. The contact pressure of the inner gear 22a with the friction members 26, 28 or the side of the case 10 does not change, and accordingly, the transmitting torque of the inner gear 22a is always constant, and the dispersion never occurs.

In order to adjust the limiter torque of the torque limiter to a proper value, the spring power adjusting member 23 is rotated by an external manipulation, and the abutting position corresponding to the cam surface 27a of the cam groove 27 of each pin 70 is shifted. Each pin 70 shifts in the axial direction according to the displacement amount of the depth of the cam groove 27 by the rotation of the spring power adjusting member 23.

The plate 74 shifts in parallel according to the transfer of the pin 70 in the axial direction, and the leaf spring 72 is warped uniformly, and the warping amount of the leaf spring 72 changes, and the friction holding power for holding the inner gear 22 in a slip rotation possible manner toward the side of the stationary member 11, namely, the limiter torque changes. After the adjustment of the torque, the set screw 35 screwed to the thread hole 33 is rotated in the clamping direction, and the tip of the set screw 35 is caused to contact under pressure on the outer periphery of the tubular convex portion 6a of the cover 6 and the spring power adjusting member 23 is fixed to the cover 6. The leaf spring 72 constitutes the pressing means for applying the pressure to the friction members 26, 28 relative to the inner gear 22a in the axial direction, and the spring power adjusting member 23 having the cam surface 27a receiving the elastic power of the pressing means by means of the pin 70 constitutes the spring power adjusting means for changing the spring power of the pressing means.

The pressing means and the spring power adjusting means, as shown in FIG. 15, can be applied to the embodiments shown in FIGS. 9 and 13. Also, inversely, as the structure of the pressing means and the spring power adjusting means, the construction of the pressing means and the spring power adjusting means as shown in FIGS. 9 and 13 may be adopted.

Another embodiment of the present invention will be described in the following by referring to FIG. 16.

Figure 16:
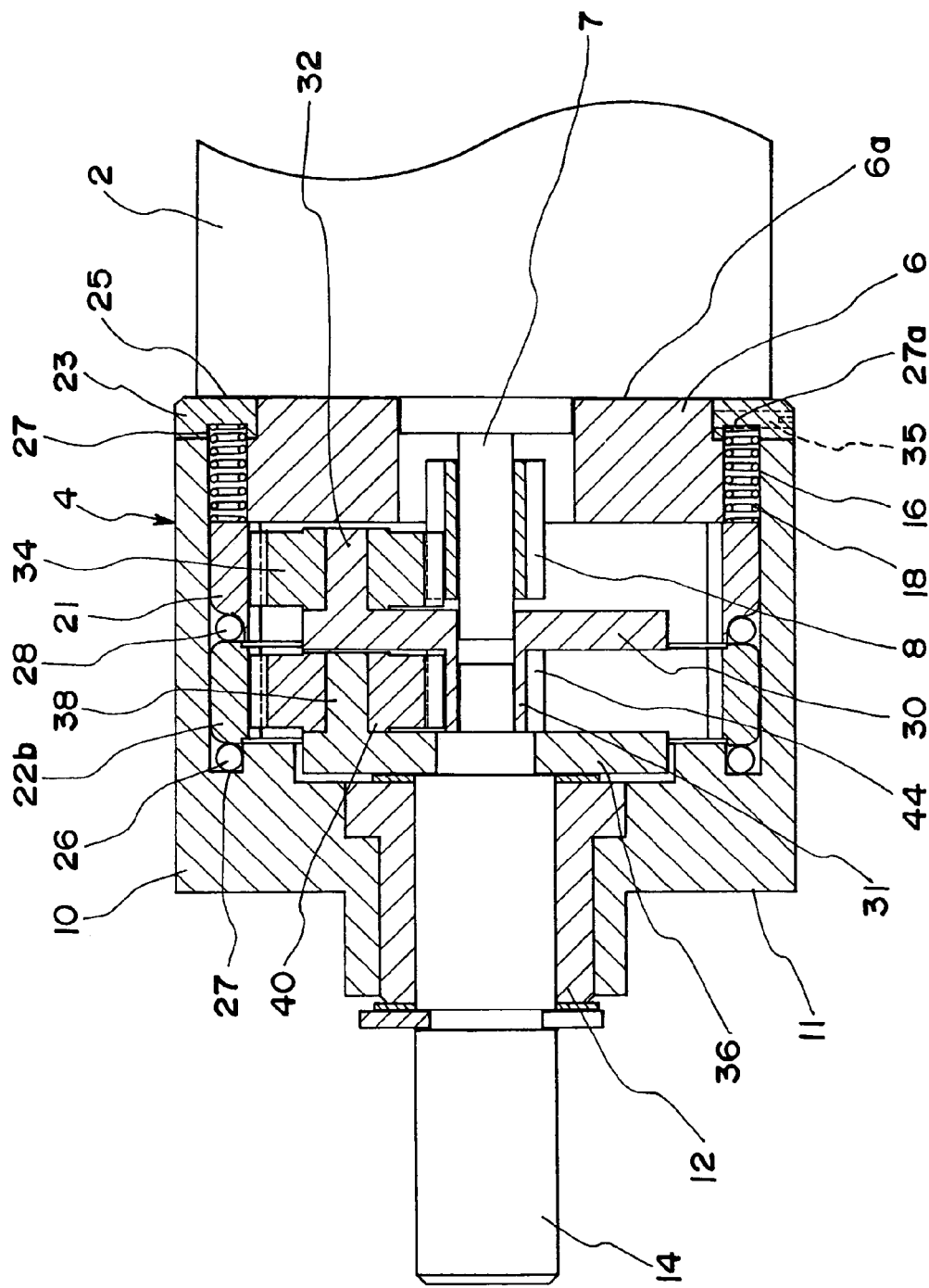
FIG. 16 is a cross section of the planetary gear type reduction gear with torque limiter according to the other embodiment of the present invention.

FIG. 16 shows the mode of the embodiment wherein the torque limiter is provided on the second stage of the two stage reduction gear, and also, the spring power adjusting means is provided, and in the drawing, numeral 23 denotes a ring-like spring power adjusting member, and its radial portion fits rotatably on the outer periphery of the tubular convex portion 6a formed on the cover 6.

The ring-like concave groove 25 is formed in the ring form by the outer periphery of the tubular convex portion 6a, the end face of the case of the reduction device, the end face of the cover 6 to which the holding hole 16 opens, and the end face of the case 10 on the border of the case 10 and the case of the reduction device 2, and both the side surfaces of the spring power adjusting member 23 are sandwiched by both wall surfaces of the concave groove 25.

Three cam grooves 27 formed with cam surface 27a having a slope relative to the side surface 23a are formed along the circumferential direction of the one side surface 23a of the spring power adjusting member 23 with an angular difference of 120 degrees in mutually circumferential direction. The cam grooves 27 have an identical surface groove structure mutually, and the number of cam grooves is equal to the number of the holding holes. The cam grooves are disposed in opposition to the holding holes 16, respectively. The coil spring 18 in each holding hole 16 is in an almost vertical elastic contact with the cam surface 27a of the corresponding cam groove 27.

The spring power adjusting member 23 is bored with the hole for insertion of tool, and the thread hole for the set screw 35 for its rotation manipulation. The construction of the spring power adjusting member 23 is identical with the construction of the spring power adjusting member 23 used in the embodiment shown in FIG. 9. Other constructions of the present embodiment are identical with the construction of the mode of the embodiment shown in FIG. 4, and the identical codes are applied to the corresponding portions, and the descriptions thereof are omitted.

In the foregoing construction, when the input shaft 7 turns, the central gear 8 turns at the same speed, and this rotation is transmitted to the planetary gear 34. The planetary gear 34 rotates with the carrier pin as the rotating axis, and revolves with the axis of the inner rotating axis, and revolves with the axis of the inner periphery of the case 10 as the pivot along the inner gear 21. When the planetary gear 34 revolves, the carrier 30 rotates with the axis of the inner periphery of the case 10 and the central gear 44 rotates. By the rotation of the central gear 44, the planetary gear 40 rotates with the carrier pin 39 as the rotating axis, and revolves along the inner gear 22b. When the planetary gear 40 revolves, the second carrier 36 rotates, and the output is produced from the output shaft 14 which is reduced at a predetermined reduction ratio.

On the other hand, when the load of more than the slip torque which is above a predetermined load is applied to the output shaft 14 such that the output shaft 14 is stopped, the revolving motion of the planetary gear 40 is stopped by the load. The rotary torque of the planetary gear 40 works on the inner gear 22b as the carrier pin 38 as the pivot. The inner gear 22b meshed with the gear 40 by the rotary torque makes the slip rotation along the inner periphery of the case 10 by resisting the friction holding force caused by the friction members 26, 28. The DC motor is not worked with the overload because of the slip rotation.

The pressing means and the spring power adjusting means in the present embodiment are identically formed with the pressing means and the spring power adjusting means of the embodiment mode of FIG. 9, however the construction of the pressing means using the leaf spring 72 and the spring power adjusting means in the embodiment mode of FIG. 14 may be employed.

The other mode of the embodiment of the present invention will be described in the following by referring to FIG. 17.

Figure 17:
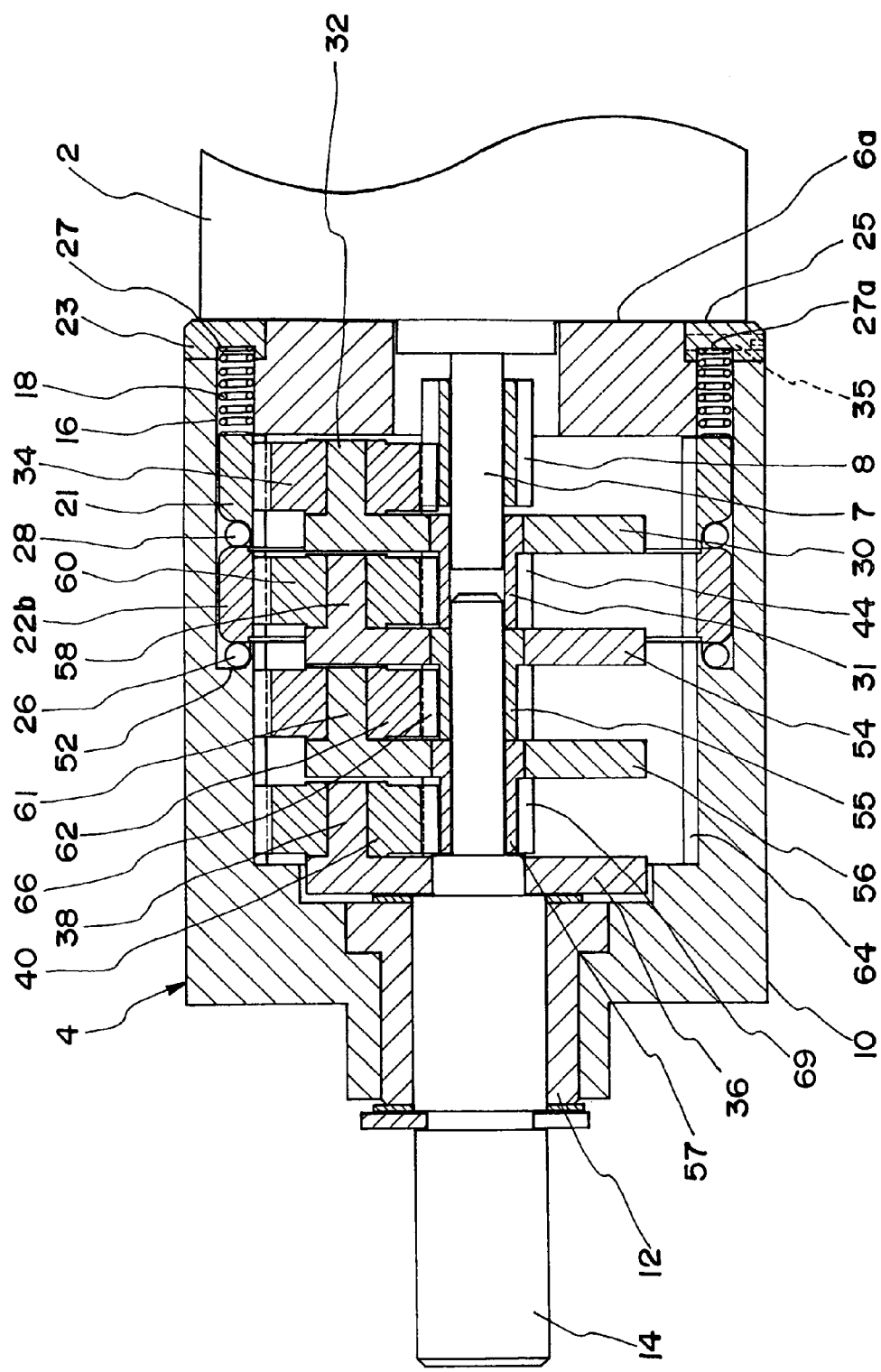
FIG. 17 is a cross section of the planetary gear type reduction gear with torque limiter according to the other embodiment of the present invention.

FIG. 17 shows the embodiment mode wherein the torque limiter is provided at the second stage of the four stage reduction gear, and also, the spring power adjusting means is provided, and in the drawing, numeral 23 denotes the ring-like spring power adjusting member, and its radial portion fits rotatably on the outer periphery of the tubular convex portion 6a formed on the cover 6.

The ring-like concave groove 25 is formed on the border of the case 10 and the case of the reduction device 2 at the outer periphery of the tubular convex portion 6a, the end face of the case of the reduction device 2, the end face of the cover 6 to which the holding hole 16 opens, and the end face of the case 10, and both the side surfaces of the spring power adjusting member 23 is rotatably sandwiched by both the wall surfaces of the concave groove 25.

Three cam grooves 27 formed with the cam surface 27a having a slope relative to the side surface 23a are formed with an angular difference of 120 degrees in mutually circumferential direction along the circumferential direction on the one side surface 23a of the spring power adjusting member 23. Each cam groove 27 has a mutually identical cam surface structure, and its number is identical with the number of the holding holes 16 and being disposed in opposition to the each holding hole 16. The coil spring 18 in the each holding hole 16 is almost perpendicularly elastically contact with the cam surface 27a of the corresponding cam groove 27.

The spring power adjusting member 23 is bored with a hole for insertion of a tool and a thread hole for the set screw 35 for its rotation manipulation. The construction of the spring power adjusting member 23 is identical with the construction of the embodiment mode as shown in FIG. 7 and identical codes are applied to the corresponding portions in FIG. 7, and their description is omitted.

In the foregoing construction, when the input shaft 7 rotates, the central gear 8 rotates at the same speed, and this rotation is transmitted to the planetary gear 34. The planetary gear 34 revolves with the carrier pin 32 as a rotating axis, and revolves along the inner gear 21.

When the planetary gear 34 revolves, the carrier 30 rotates and the planetary gear 44 rotates. When the gear 44 rotates, the planetary gear 66 rotates with the carrier pin 58 as the rotating axis, and revolves along the inner gear 22b.

When the planetary gear 60 revolves, the second carrier 54 rotates and the central gear 66 rotates. When the central gear 66 rotates, the planetary gear 62 rotates with the carrier pin 61 as the rotating axis, and revolves along the inner gear 64. When the planetary gear 62 revolves, the carrier 56 rotates, and the planetary gear 68 rotates. When the central gear 68 rotates, the planetary gear 40 rotates with the carrier pin 38 as the rotating axis and revolves along the inner gear 64. When the planetary gear 40 revolves, the fourth carrier 36 rotates, and the output that is reduced to a predetermined reduction speed is produced from the output shaft 14.

On the other hand, when the output shaft 14 is stopped or the like by some reason, and the load above a predetermined value namely the load above the slip torque is worked on the output shaft 24, the rotations of the carriers 36, 56, 54 are stopped by the load. The rotary torque of the planetary gear 60 is worked on the inner gear 22b with the carrier pin 58 as the pivot. The inner gear 22b makes a slip rotation along the inner periphery of the case 10 by resisting the sandwiching friction holding force applied by the friction members 26, 28 which are meshed with the planetary gear 60, and thus, the overload is not worked on the DC motor.

For reference, the operation of adjusting the limiter torque by rotating the spring power adjusting member 23 is identical with the embodiment shown in FIG. 9, and its description is omitted.

Figure 18:
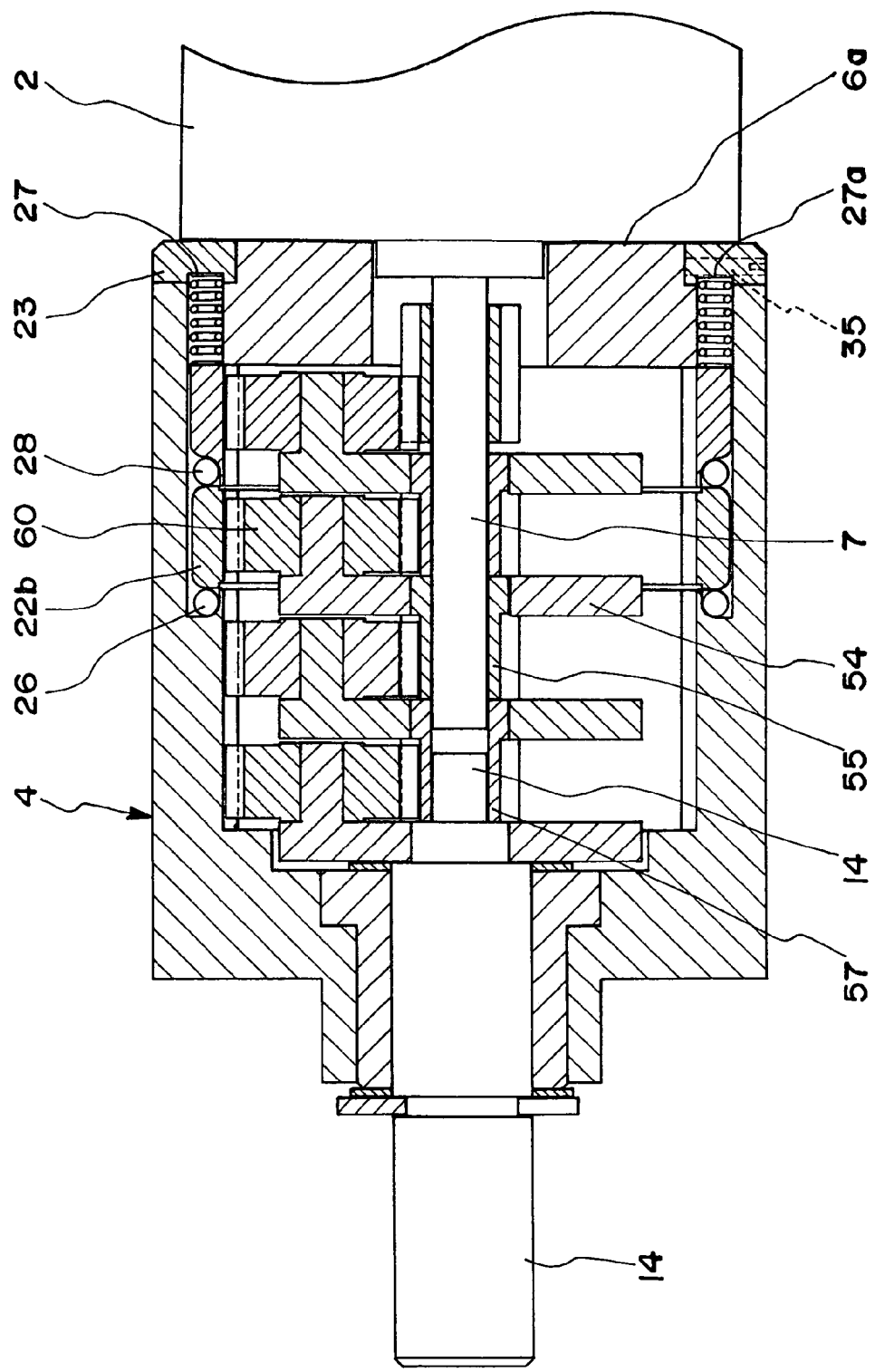
FIG. 18 is a cross section of the planetary gear type reduction gear with torque limiter according to the other embodiment of the present invention.

In the embodiment shown in FIGS. 13 and 14, the carrier 30 journalizing the planetary gear 34 meshed with the inner gears 22, 22a constituting the torque limiter is journalized rotatably on both the input shaft 7 and the output shaft 14, and in the embodiment shown in FIG. 17, the carrier 54 journalizing the planetary gear 60 meshed with the inner gear 22a constituting the torque limiter is journalized rotatably on the output shaft 14 but as shown in FIG. 18, the carrier 54 arranged to journalize the planetary gear 60 meshed with the inner gear 22b constituting the torque limiter may be rotatably journalized on the input shaft 7. The other construction in FIG. 8 may be identical with the construction of the embodiment shown in FIG. 17.

For reference, the pressing means and the spring power adjusting means in the embodiment shown in FIGS. 17 and 18 are constructed to be identical with the pressing means and the spring power adjusting means of the embodiment of FIG. 9. However, the construction of the pressing means and the spring power adjusting means using the leaf spring 72 of the embodiment of FIG. 14 may be adopted.

What is claimed is:

1. A planetary gear type reduction gear with torque limiter including at least one stage of a planetary gear type reduction mechanism, the planetary gear type reduction gear comprising:

a stationary member;
an input shaft rotatably supported in the stationary member:
an output shaft rotatably supported in the stationary member;
a central gear;
a planetary gear meshed with the central gear;
an inner gear meshed with the planetary gear; and
a carrier rotatably supporting the planetary gear,
wherein the torque limiter is formed between the input shaft and the output shaft, the torque limiter being comprised by the inner gear, which is opposed to a surface of the stationary member and disposed with a clearance in a radial direction relative to the stationary member, and the inner gear is opposed in the axial direction relative to the stationary member by means of a friction member, and the inner gear is under pressure from the friction member in the axial direction such that the inner gear is retained at a side of the stationary member by the friction member,
wherein the friction member is provided at each side of the inner gear, and the inner gear is opposed and disposed to the side of the stationary member by means of the friction member, and both sides of the inner gear are caused to contact the side of the stationary member by means of the friction member, and the inner gear is retained at the side of the stationary member by the friction force between the friction member and the side of the stationary member and by the friction force between the friction member and the inner gear under pressure from the friction member.

2. A planetary gear type reduction gear with torque limiter according to claim 1, wherein the friction member is a ring-like elastic member.

3. A planetary gear type reduction gear with torque limiter according to claim 1, further comprising a pressing means for pressing the friction member towards the inner gear, wherein the pressing means is provided in an input side of the stationary means.

4. A planetary gear type reduction gear with torque limiter according to claim 3, wherein the pressing means comprises a coil spring.

5. A planetary gear type reduction gear with torque limiter according to claim 1, wherein the pressing device comprises at least one coil spring.

6. A planetary gear type reduction gear with torque limiter including at least one stage of a planetary gear type reduction mechanism, the planetary gear type reduction gear comprising:
   a stationary member;
   an input shaft rotatable supported in the stationary member;
   an output shaft rotatable supported in the stationary member;
   a first central gear;
   a first planetary gear meshed with the first central gear;
   a first inner gear meshed with the first planetary gear;
   a first carrier rotatably supporting the first planetary gear; and
   a torque limiter formed between the input shaft and the output shaft, the torque limiter being constructed such that the first inner gear is opposed to a surface of the stationary member and disposed with a clearance in a radial direction relative to the stationary member, and the first inner gear is opposed in the axial direction relative to the stationary member by means of a friction member, and the first inner gear is under pressure from the friction member in the axial direction such that the first inner gear is retained at a side of the stationary member by the friction member,
   wherein a plurality of stages of the planetary gear type reduction mechanism are provided, and a first stage reduction mechanism is constructed by providing the first central gear on the first input shaft, and meshing the first planetary gear with the first central gear, and meshing the first inner gear with the first planetary gear, and providing a first carrier that rotatable supports the first planetary gear, and the reduction mechanism after a second stage is constructed by providing a central gear on the first carrier of the first stage reduction mechanism, and meshing the planetary gear of the next stage with the central gear, and meshing the inner gear with the planetary gear of the next stage, and providing a carrier journalizing the planetary gear of the next stage, and the input shaft and the output shaft are opposed to each other and disposed coaxially, and a tubular bearing is inserted across both of the shafts to connect both shafts by means of the bearing to rotate freely and relatively, and a carrier journalizing the planetary gear meshed with the inner gear constituting the torque limiter is supported by the bearing on the input shaft or the output shaft or both of the shafts so as to be rotatable.

7. A planetary gear type reduction gear with torque limiter including at least one stage of a planetary gear type reduction mechanism, the planetary gear type reduction gear comprising:
   a stationary member;
   an input shaft rotatable supported in the stationary member:
   an output shaft rotatably supported in the stationary member;
   a first central gear;
   a first planetary gear meshed with the first central gear;
   a first inner gear meshed with the first planetary gear;
   a first carrier rotatable supporting the first planetary gear; and
   a torque limiter formed between the input shaft and the output shaft, the torque limiter being constructed such that the first inner gear is opposed to a surface of the stationary member and disposed with a clearance in a radial direction relative to the stationary member, and the first inner gear is opposed in the axial direction relative to the stationary member by means of a friction member, and the first inner gear is under pressure from the friction member in the axial direction such that the first inner gear is retained at a side of the stationary member by the friction member,
   wherein a plurality of stages of the planetary gear type reduction mechanism are provided, and the first stage reduction mechanism is constructed by providing the first central gear on the input shaft, and meshing the first planetary gear with the first central gear, and meshing the first inner gear with the first planetary gear, and providing the first carrier which rotatable supports the first planetary gear, and the reduction mechanism after the second stage is constructed by providing a central gear on the first carrier of the first stage reduction mechanism, and meshing the planetary gear of the next stage with the central gear, and meshing the inner gear with the planetary gear of the next stage, and providing a carrier journalizing the planetary gear of the next stage, and the torque limiter is constructed by disposing the inner gear that is a constituting element of the reproduction mechanism before the reduction mechanism of the final stage among a plurality of the stages of the reduction mechanism at a clearance to the stationary member in the radius direction, and disposing the friction member in opposition to the side of the inner gear in the axial direction, passing the friction member to the inner gear in the axial direction, and holding the inner gear to the side of the stationary member, and retaining the inner gear to the side of the stationary member by the friction force.

8. A planetary gear type reduction gear with torque limiter according to claim 7 wherein the torque limiter is the reduction mechanism just before the reduction mechanism of the final stage among a plurality of the reduction mechanism and the inner gear that is a constituting element of the reduction mechanism including the reduction mechanism which is the closest to the input shaft is disposed at a clearance to the stationary member in the radius direction, and the friction member is disposed in opposition to the side of the inner gear in the axial direction, and the friction member applies the pressure to the inner gear in the axial direction, and the inner gear is retained to the side of the stationary member by the friction force.

9. A planetary gear type reduction gear with torque limiter including at least one stage of a planetary gear type reduction mechanism, comprising:
a stationary member;
an input shaft rotatable supported in the stationary member;
an output shaft rotatable supported in the stationary member;
a central gear;
a planetary gear meshed with the central gear;
an inner gear meshed with the planetary gear;
a carrier rotatable supporting the planetary gear and provided between the input shaft and the output shaft;
a friction member disposed in the stationary member so as to oppose the inner gear in the axial direction, wherein the inner gear is retained at a side of the stationary member by a friction force;
a pressing device including a spring for applying a pressing force to the friction member in a direction toward the inner gear such that the friction member is compressed by the pressing force in the axial direction, and
a spring force adjusting member for adjusting the pressing force of the pressing device, the spring force adjusting member being provided at the one side of the stationary member,
wherein the spring force adjusting member has a cam surface formed with a slope along a circumferential direction of the spring force adjusting member, the cam surface facing the pressing device, and the spring power adjusting member is supported at the side of the stationary member so as to be rotatable by an external manipulation, and the pressing device can be compressed by the cam surface and the pressing force of the pressing device can be varied by the rotation of the spring power adjusting member.

10. A planetary gear type reduction gear with torque limiter according to the claim 9, wherein the spring of the pressing device is a leaf spring.

11. A planetary gear type reduction gear with torque limiter according to the claim 9, wherein the friction member comprises a ring-like elastic member.

12. A planetary gear type reduction gear with torque limiter including at least one stage of a planetary gear type reduction mechanism, comprising:
a stationary member;
an input shaft rotatably supported in the stationary member;
an output shaft rotatably supported in the stationary member;
a central gear;
a planetary gear meshed with the central gear;
an inner gear meshed with the planetary gear;
a carrier rotatably supporting the planetary gear and provided between the input shaft and the output shaft;
a plurality of friction members disposed in the stationary member so as to oppose the inner gear in the axial direction such that the inner gear is retained at a side of the stationary member by a friction force;
a pressing device including a spring for applying a pressing force to the friction member in a direction toward the inner gear such that the friction member is compressed by the pressing force in the axial direction, and
a spring force adjusting means, provided at one side of the stationary member, for adjusting the pressing force of the pressing device,
wherein the friction members are provided at both sides of the inner gear, and the inner gear is opposed and disposed relative to the side of the stationary member by means of the friction members, and both sides of the inner gear are made to contact the side of the stationary member by means of the friction members, and the inner gear is retained at the side of the stationary member by the friction power between the friction members and the side of the stationary member and the friction power between the friction members and the inner gear under pressure from the friction members.

13. A planetary gear type reduction gear with torque limiter including at least one stage of a planetary gear type reduction mechanism, comprising:
a stationary member;
an input shaft rotatable supported in the stationary member;
an output shaft rotatable supported in the stationary member;
a first central gear;
a first planetary gear meshed with the central gear;
a first inner gear meshed with the planetary gear;
a first carrier rotatable supporting the first planetary gear and provided between the input shaft and the output shaft;
a friction member disposed in the stationary member so as to oppose the first inner gear in the axial direction, wherein the first inner gear is retained at a side of the stationary member by a friction force;
a pressing device including a spring for applying a pressing force to the friction member in a direction toward the first inner gear such that the friction member is compressed by the pressing force in the axial direction, and
a spring force adjusting means for adjusting the pressing force of the pressing device, the spring force adjusting means being disposed at one side of the stationary member,
wherein a plurality of stages of the planetary gear type reduction mechanism are provided, and the first stage reduction mechanism is constructed such that the first central gear is provided on the input shaft, and the first planetary gear is meshed with the first central gear, and the first inner gear is meshed with the first planetary gear, and a second carrier is provided for journalizing the first planetary gear, and the reduction mechanisms from the second stage on are constructed such that a central gear is provided on the carrier of the reduction mechanism of the preceding stage, and a planetary gear of the next stage is meshed with the central gear, and an inner gear is meshed with the planetary gear of the next stage, and the input shaft and the output shaft are opposed and disposed on the same axis, and both the shafts are connected relatively rotatable by inserting a tubular bearing across both of the shafts, and the carrier journalizing the planetary gear is meshed with the inner gear forming the torque limiter is rotatably supported on the input shaft or the output shaft or on both of the shafts.

14. A planetary gear type reduction gear with torque limiter including at least one stage of a planetary gear type reduction mechanism, comprising:
a stationary member;
an input shaft rotatably supported in the stationary member;
an output shaft rotatable supported in the stationary member;
a first central gear;
a first planetary gear meshed with the central gear;
a first inner gear meshed with the first planetary gear;

a first carrier rotatably supporting the first planetary gear and provided between the input shaft and the output shaft;

a friction member disposed in the stationary member so as to oppose the first inner gear in the axial direction, wherein the first inner gear is retained at a side of the stationary member by a friction force;

a pressing device including a spring for applying a pressing force to the friction member in a direction toward the first inner gear such that the friction member is compressed by the pressing force in the axial direction, and a spring force adjusting means for adjusting the pressing force of the pressing device, wherein the spring force adjusting means is provided at one side of the stationary member, wherein a plurality of stages of the planetary gear type reduction mechanism are provided, and the reduction mechanism of the first stage is provided with the first central gear on the first input shaft, and the first planetary gear is meshed with the first central gear, and the first inner gear is meshed with the first planetary gear, and the first carrier is provided for journalizing the first planetary gear, and the reduction mechanism succeeding the second stage is constructed such that a central gear is provided on the first carrier of the reduction mechanism of the preceding stage, and a planetary gear of the next stage is meshed with the central gear, and an inner gear is meshed with the planetary gear of the next stage, and a carrier is provided for rotatably supporting the planetary gear of the next stage, and the torque limiter is constructed such that an inner gear constituting element of the reduction mechanism one stage preceding the last stage reduction mechanism among the plurality of stages of the reduction mechanism is disposed with a clearance in the radial direction relative to the stationary member, and the friction member is opposed and disposed at the side of the inner gear in the axial direction, and the friction member is under pressure from the inner gear in the axial direction, and the inner gear is retained at the side of the stationary member by the friction force.

15. A planetary gear type reduction gear with torque limiter according to the claim 14 wherein the torque limiter is constructed in that an inner gear which is a constituting member of the reduction mechanism including the reduction mechanism that is the closest to the input shaft which is the reduction mechanism preceding the reduction mechanism of the final stage reduction mechanism among the plurality of stages of the reduction mechanism is disposed at a clearance in the radius direction relative to the stationary member, and the friction member is opposed and disposed at the side of the axial direction of the inner gear, and the friction member is under pressure in the axial direction relative to the inner gear, and the inner gear is retained at the side of the stationary member by the friction power.

* * * * *